United States Patent [19]

Uchiyama

[11] Patent Number: 5,659,816

[45] Date of Patent: Aug. 19, 1997

[54] FOCUS DETECTION DEVICE AND METHOD

[75] Inventor: Shigeyuki Uchiyama, Tokyo, Japan

[73] Assignee: Nikon Corporation, Tokyo, Japan

[21] Appl. No.: 497,232

[22] Filed: Jun. 30, 1995

[30] Foreign Application Priority Data

Sep. 7, 1994 [JP] Japan .................................. 6-214062

[51] Int. Cl.$^6$ .............................. G03B 3/00; G03B 13/18
[52] U.S. Cl. ........................ 396/124; 396/121; 396/122; 396/123
[58] Field of Search ...................... 354/406, 407, 354/408, 402; 396/89, 121–124

[56] References Cited

U.S. PATENT DOCUMENTS

| | | | |
|---|---|---|---|
| 4,410,258 | 10/1983 | Aoki et al. | 354/25 |
| 4,561,749 | 12/1985 | Utagawa . | |
| 4,634,851 | 1/1987 | Ogasawara et al. | 354/408 |
| 4,762,987 | 8/1988 | Ishida et al. | 354/408 |
| 5,089,842 | 2/1992 | Uchiyama et al. | 354/408 |
| 5,159,383 | 10/1992 | Ishida et al. | 354/406 |
| 5,202,555 | 4/1993 | Ishida et al. | 354/408 |
| 5,218,395 | 6/1993 | Taniguchi et al. | 354/407 |
| 5,367,153 | 11/1994 | Suda et al. | 354/407 |
| 5,469,240 | 11/1995 | Uchiyama et al. | 354/406 |

FOREIGN PATENT DOCUMENTS

| | | |
|---|---|---|
| 60-37513 | 2/1985 | Japan . |
| 61-245123 | 10/1986 | Japan . |

*Primary Examiner*—Safet Metjahic
*Assistant Examiner*—Michael Dalakis
*Attorney, Agent, or Firm*—Oliff & Berridge

[57] ABSTRACT

A focus detection device includes a pair of photoelectric converting element arrays that output a pair of signal strings and a focus detection optical system, including a photo lens, that conducts a pair of light rays from a subject to the pair of photoelectric converting element arrays. A filter extracts a pair of signal strings having a predetermined frequency component from the pair of signal strings outputted by the photoelectric converting element arrays. A calculation range setting device sets a calculation range of signals of the pair of extracted signal strings, and a focus detection calculating device calculates a focus adjustment condition for the photo lens based on the signals of the pair of extracted signal strings in the calculation range. A contrast calculation device calculates the contrasts in areas outside the calculation range based on the signals of the pair of extracted signal strings excluded from the calculation range, wherein the operation of the focus detection calculating device is dependent upon the calculated contrasts. When the calculated contrast exceeds a predetermined value, focus detection calculations based on a pair of signal strings with lower frequency components are not carried out, or else the shift range for correlation calculations is narrowed, or else the threshold values for reliability determination are changed and the reliability determination standard is made to be more restrictive, or else the focus detection calculation range is narrowed.

24 Claims, 22 Drawing Sheets

FOCUS DETECTION DEVICE AND METHOD

BACKGROUND

1. Field of the Invention

The present invention relates to a focus detection device that is used on cameras, videos, and the like.

2. Background of the Related Art

Phase difference detection-type focus detection devices for cameras are commonly known. FIG. 14 is a schematic diagram of a conventional phase difference detection-type focus detection device. Incident light rays from area 101 of the photo lens 100 pass a field of field mask 200, a field lens 300, an aperture stop 401, and an re-imaging lens 501. The rays are then composed into an image on an image sensor array A. The photoelectric converting elements are arranged linearly to form a row and generate outputs according to the incident light intensity. In the same manner, incident light rays from area 102 of the photo lens 100 pass the field of field mask 200, the field lens 300, an aperture stop 402, and an re-imaging lens 502, and are composed into an image on an image sensor array B.

The pair of subject images composed on the image sensor array rows A and B diverge in the so-called front focus condition, in which the photo lens 100 forms a clear image of the subject in front of a predetermined focus surface. The pair of subject images converge in the so-called back focus condition, in which a clear image of the subject is formed behind the predetermined focus surface. In a focused condition, a clear image of the subject is formed exactly at the predetermined focus surface and the subject images on the image sensor array row A and row B coincide relative to each other.

The pair of subject images on image sensor array rows A and B undergo photoelectric conversion and are converted to electrical signals. By mathematically processing these signals, the relative positions of the two subject images can be calculated, and the focus adjustment condition, i.e., the amount and direction of separation from the focused condition of the object lens 100 (referred to hereafter as "the defocus amount") can be determined.

The projected images formed by the re-imaging lenses 501,502 on the image sensor array rows A and B, respectively, overlap in the vicinity of a predetermined focus surface. As shown in FIG. 13, this area of overlap is generally the area shown by the dotted lines in the central region of the photographic field, and is referred to as the "focus detection area."

The mathematical processing method for calculating the defocus amount is described next.

The image sensor array rows A and B each comprise a plurality of photoelectric converting elements having a plurality of output signal strings a[1], . . . ,a[n] and b[1], . . . .b[n], respectively (refer to FIGS. 15(a), 15(b)). Correlation calculations are carried out while the data in a specified area within the pair of output signal strings of rows A and B are shifted a fixed amount. The L range, i.e., data line shift amount range, in which a maximum shift number is taken to be lmax, becomes −lmax to lmax. Specifically, the correlation amount C [L] is calculated through the following Formula 1.

$$C[L] = \Sigma |a[i+L] - b[i]| \quad (1)$$

where L=−lmax, . . . ,−2,−1,0,1,2, . . . ,lmax and $\Sigma$ indicates the summation of i=k to r.

In Formula 1, L is an integer corresponding to the data line shift amount described above. The initial value k and the final value r depend on the shift amount L, as shown, for example, in the following Formula 2:

When L≥0:

$$k = k0 + INT\{-L/2\}$$

$$r = r0 + INT\{-L/2\}$$

When L<0:

$$k = k0 + INT\{(-L+1)/2\}$$

$$r = r0 + INT\{(-L+1)/2\} \quad (2)$$

where k0 and r0 are the initial and final values, respectively, when the shift amount L is 0.

The combination of signals used to calculate the absolute value of the difference between the row A signals and the row B signal in Formula 1 when the initial value k and the final value r are calculated by Formula 2 are shown in FIGS. 16(a)–16(e). Thus, along with the change in the shift amount L, the ranges used for the correlation calculations for rows A and B shift in opposite directions relative to each other.

The initial value k and the final value r can also be set regardless of the shift amount L. In this case, the range used for the correlation calculation of one line is continually fixed, and only the other line shifts. Since the relative position shift amount becomes the shift amount L when a pair of data match, the shift amount which gives the local minimum correlation amount C[L] is determined. This amount, coupled with a constant determined by the optical system and the pitch width of the photoelectric converting elements of the image sensor arrays, becomes the defocus amount. Thus, the larger the maximum shift number lmax, the larger the defocus amount for which detection can be carried out.

The correlation amounts C[L] are scattered values, and the smallest unit of the defocus amount that can be detected is limited by the pitch width of the photoelectric converting elements of the image sensor array rows A and B. To overcome this limitation, a method is disclosed by the present assignee in Japanese Unexamined Patent Application Sho 60-37513 corresponding to U.S. Pat. No. 4,561, 749, in which a new local minimum value Cex is calculated by interpolating from the scattered correlation amounts C[L]. The new local minimum value Cex is then used in carrying out detailed focus detection. As shown in FIG. 17, this method calculates the true local minimum value Cex and the shift amount Ls corresponding to Cex through Formula 3 and Formula 4, respectively, using the correlation amount C[l], i.e., the minimum value of the correlation amounts, and the correlation amounts C[l+1] and C[l−1], i.e., the shift amounts on either side of the correlation amount C [l].

$$DL = (C[l-1] - C[l+1])/2$$

$$Cex = C[l] - |DL|$$

$$E = MAX \{[C[l+1] - C[l], C[l-1] - C[l]]\} \quad (3)$$

$$Ls = l + DL/E \quad (4)$$

In Formula 3, MAX {Ca, Cb} means that the larger value of Ca and Cb is selected. The defocus amount DF is calculated from the above mentioned shift amount Ls according to Formula 5.

$$DF = Kf \times Ls \quad (5)$$

In Formula 5, Kf is a constant that depends on the optical system used and the pitch width of the photoelectric converting elements of the image sensor arrays.

It is also necessary to determine whether the defocus amount thus obtained indicates the true defocus amount, or whether the determined defocus amount is the result of noise or the like. A determined defocus amount that satisfies the following Formula 6 is considered to be reliable.

$$E > E1 \ \& \ Cex/E < G1 \quad (6)$$

where E1 and G1 are specified threshold values. The numerical value E is a value that indicates the changed state of the correlation amount and depends on the contrast of the subject; the larger the value, the higher the contrast and the higher the reliability. Cex is the difference when the pair of data most closely coincide, and is initially 0. However, due to the influence of noise and because of parallax generated by areas 101,102, Cex will not be 0. Because higher contrast results in a smaller influence from noise, Cex/E is used as the numerical value that indicates the degree of coincidence of a pair of data. Obviously, the closer the value of Cex/E is to 0, the higher the degree of coincidence of the data pair and the higher the reliability. Instead of the numerical value E, the contrast relating to one of the pair of data can be calculated and the reliability evaluation carried out using this calculated contrast.

When reliability is ascertained, the photo lens 100 is driven or a display is carried out based on the defocus amount DF. The above Formulas 1–6, consisting of correlation calculations, interpolation calculations, and conditional evaluations, are referred to, in general, as the focus detection calculations.

In the focused condition of the photo lens 100, since focus detection devices are generally structured so that a pair of data will coincide when the shift amount L is virtually 0, the photo lens 100 cannot be focused on the subject if the subject images are not formed in the range from the initial value k0 to the final value r0 of the image sensor array row A and row B. Therefore, the area in which focus detection is carried out is established through the initial value k0 and the final value r0. For example, if the initial value k0 and the final value r0 are taken to be a portion of the central area of the photographic field, the area in which focus detection is carried out becomes the area shown by the solid lines in the central area of the photographic field, as shown in FIG. 13. Hereafter, the data range from the initial value k0 to the final value r0 will be called the calculation range. The area corresponding to the calculation range in the photographic field is the focus detection area. The photographer can focus the photo lens on the desired subject by capturing the subject within the focus detection area.

The focus detection device may be provided with a switching device that can switch between a wide mode, which takes virtually the entire image sensor array as the focus detection area, and a spot mode, which takes the center portion of the sensor array as the focus detection area. In the wide mode, the initial value k0 and the final value r0 are set so that the calculating range will widen. In the spot mode, the initial value k0 and the final value r0 are set so that the calculation range will narrow.

The output signal strings $a[1], \ldots, a[n]$ and $b[1], \ldots, b[n]$ of the image sensor array rows A and B, respectively, may be directly used in the focus detection calculations. However, because there are cases in which a correct focus detection cannot be accomplished because of the presence of frequency components higher than the Nyquist frequency of the subject, or because of the influence of unbalanced outputs of rows A and B, filtering of the output data strings if preferred. A method is disclosed by the present assignee in Japanese Unexamined Patent Application Sho 61-245123 in which a filter calculation procedure is performed on the output signal strings. Focus detection calculations are then carried out using the obtained filter procedure data. For example, a filter procedure calculation that removes the high frequency components above the Nyquist frequency is achieved by Formula 7. The filter processing data $Pa[1], \ldots, Pa[n-2]$ and $Pb[1], \ldots, Pb[n-2]$ are obtained from the output signal strings $a[1], \ldots, a[n]$ and $b[1], \ldots, b[n]$ of the rows A and B, respectively.

$$Pa[i] = (a[i] + 2 \times a[i+1] + a[i+2])/4$$

$$Pb[i] = (b[i] + 2 \times b[i+1] + b[i+2])/4 \quad (7)$$

where i=1 to n–2.

A subsequent filter procedure calculation is performed on the filter processing data $Pa[1], \ldots, Pa[n-2]$ and $Pb[1], \ldots, Pb[n-2]$ which removes the influence of unbalanced outputs of the row A and the row B. This calculation is carried out, for example, according to Formula 8, and the filter processing data $Fa[1], \ldots, Fa[n-2-2s]$ and $Fb[1], \ldots, Fb[n-2-2s]$ are obtained.

$$Fa[i] = -Pa[i] + 2 \times Pa[i+s] - Pa[i+2s]$$

$$Fb[i] = -Pb[i] + 2 \times Pb[i+s] - Pb[i+2s] \quad (8)$$

where i=1 to n–2–2s

In Formula 8, s is an integer from 1 to 10. The higher the numerical value, the lower the frequency component that is extracted from the subject pattern; the lower the numerical value, the higher the frequency component that is extracted from the subject pattern. In addition, the number of filter processing data decreases as s increases.

Since the subject image includes more high frequency components as the focused condition is approached, it is desirable to have a comparatively small value for s; and since the subject image blurs in the un-focused condition and has only low frequency components, a large value of s is desirable. Therefore, when s is small, since the low frequency components are not extracted, detection becomes impossible when the defocus amount is large. In this case, it is meaningless to have a very large maximum shift number lmax in Formula 1; a comparatively small value will suffice. Conversely, when s is large, detection is possible even when the defocus amount is large because the low frequency components are extracted. Therefore, a comparatively large value is set for lmax.

In addition, when the value of s is comparatively large, the filter processing data Fa[i] and Fb[i] obtained through Formula 8 may each be halved by taking every other datum. When this is done, since 2 pixel widths are held in one datum, only half the calculation range is needed for the same focus detection area. Since shift amount 1 of the case where the data is halved corresponds to shift amount 2 of the case where the data is not halved, a defocus amount of the same size can be detected even though the maximum shift number is only half.

FIGS. 18(a)–18(c) graphically illustrate a subject pattern that is formed only from low frequency components. FIG. 18(a) displays the output signal, FIG. 18(b) displays the filter processing data with s=2, and FIG. 18(c) displays the filter processing data with s=8. Since the system is in the focused condition in these drawings, the row A output signal string and the row B output signal string overlap. As shown in the figures, the filter processing data with s=2 has virtually no contrast and is virtually flat. When s=8, the contrast becomes sufficient and a reliable defocus amount can be obtained. As shown in FIG. 18(c), since the wide calculating range ce2 includes more contrast than the narrow calculating range ce1, ce2 is more advantageous for focus detection calculations. In other words, the wider calculating range is desirable for filter processing data for which low frequency components are extracted.

FIGS. 19(a)–19(c) graphically illustrate an example of a subject pattern that is formed only by high frequency components. FIG. 19(a) shows the output signal, FIG. 19(b) shows the filter processing data with s=2, and FIG. 19(c) shows the filter processing data with s=8. Since the system is in the focused condition in these drawings, the row A output signal string and the row B output signal string overlap. In this case, sufficient contrast is obtained by filter processing data with s=2, and a reliable defocus amount can be obtained. In FIG. 19(b), when the narrow calculating range ce1 and the wide calculating range ce2 are compared, the contrast is the same for both. However, the influence of noise is less for the narrow calculating range. Further, if the range is too wide, multiple subjects with different distances may exist within the calculating range making focus detection impossible. Therefore, it is desirable to use a comparatively narrow calculating range for the filter processing data having high frequency components extracted.

FIGS. 20(a)–20(c) graphically illustrate an example of a subject pattern that includes adequate high frequency and low frequency components. FIG. 20(a) shows the output signal, FIG. 20(b) shows the filter processing data with s=2, and FIG. 20(c) shows the filter processing data with s=8. Since the system is in the focused condition in these drawings, the row A output signal string and the row B output signal string overlap. In this example, sufficient contrast may be obtained regardless of the value of s. In addition, as s increases, the range over which the contrast of the subject pattern is distributed becomes wider.

FIGS. 21(a)–21(c) graphically illustrate a case in which the defocus amount is large. This is the image sensor output which would occur, for example, in the case of a subject such as a chimney. FIG. 21(a) shows the output signal, FIG. 21(b) shows the filter processing data with s=2, and FIG. 21(c) shows the filter processing data with s=8. In addition, the solid line shows the output signal string of the row A, and the dashed line shows the output signal string of the row B. Thus, since virtually no high frequency components are included when the defocus amount is large, no contrast can be obtained by filter processing data with s=2. However, sufficient contrast can be obtained through filter processing data with s=8. The maximum shift number lmax is given a sufficiently large value, and the defocus amount can be detected.

Since the frequency components differ according to the subject pattern, s is initially set to s=2 and a filtering process is carried out that extracts high frequency components. The focus detection calculations of Formulas 1–6 are carried out using this filter processing data, and if a reliable defocus amount is obtained, the focus detection action stops. If a reliable defocus amount is not obtained, s is changed to 4 and a filtering process is carried out that extracts lower frequency components. The focus detection calculations of Formula 1–6 are then repeated using this filter processing data. The value of s is increased through this type of process until a reliable defocus amount is obtained.

According to the above method, since high frequency components are extracted first, in subject patterns that are near the normal focused condition of the subject, such as the subject pattern shown in FIG. 20(a), a reliable defocus amount can be obtained. When the subject consists only of low frequency components, e.g. a human face, and has for example a subject pattern such as that shown in FIG. 18(a), the focus detection calculations are carried out based on filter processing data having low frequency components extracted. As shown in FIGS. 21(a)–21(c), in the case of a large defocus amount, filter processing data having low frequency components extracted are used. The maximum shift number lmax is increased, the focus detection calculations are carried out, and the defocus amount can be detected. Since the calculation time is shortened near the focused condition, the subject can be easily followed even when the subject is a moving object.

For those focus detection devices that do not perform a filter process and instead directly use the output signal strings, or which only use a filter process that removes frequency components that are higher than a specific frequency, e.g the Nyquist frequency, a wide focus detection area is desirable for subject patterns that consists only of low frequency components, and a comparatively narrow focus detection area is desirable for subject patterns that include high frequency components. Therefore, the focus detection calculations are first carried out with a narrow focus detection area, and then, if a reliable defocus amount is not obtained, the focus detection calculations are carried out again with a wide focus detection area.

With the focus detection devices described above, the following problems may arise.

First, when the focus detection device switches the type of filter process for the output signal strings of the image sensors, proper ranges are provided for each filter process. However, the photographer may mistake the widest calculating range among these ranges for the focus detection area. For example, in the pattern shown in FIG. 20(a), since the filter processing data for s=2 has sufficient contrast in the calculation range established by the initial value k0 and the final value r0, as shown in FIG. 20 (b), a reliable defocus amount can be obtained. However, if the subject pattern shown in FIG. 20(a) is shifted, such as shown in FIG. 22(a), the range of filter processing data does not have any contrast in the calculation range established by the initial value k0 and the final value r0 as shown in FIG. 22(b). Consequently, a reliable defocus amount cannot be obtained for s=2. However, as shown in FIG. 22(c), using filter processing data with s=8, since the contrast range widens into the range established by the initial value k0 and the final value r0, sufficient contrast exists and a reliable defocus amount is obtained. Thus, the photographer is given a wide calculation range appropriate for filter processing data having low frequency components extracted, and can distinguish the focus detection area from the portion in which the range with contrast is widened through filter processing.

Even when the value of s is set to be optimal for a subject pattern, the calculated result for a subject pattern that consists only of low frequency components generally has a lower precision than the calculated result for a subject pattern that includes high frequency components. As described above, in filter processing with a comparatively large value of s, when the number of filter processing data Fa[i] and Fb[i] is halved, since two pixel widths are held in one datum, the precision of the interpolation calculations of Formulas 3 and 4 decreases and results in a noticeable decline in focus detection precision. Further, in the case shown in FIG. 22(c), since not all of the subject contrast is inside the calculation range, a defocus amount is obtained which is unstable. Consequently, a flickering display and so-called hunting in which the lens is slightly oscillated without stopping at the focused condition results.

When the subject pattern shown in FIG. 20(a) is moved gradually from the center of the photographic field toward the outside, a stable defocus amount is initially obtained from filter processing data with s=2. However, when contrast disappears from the calculation range, the defocus amount is then calculated based on filter processing data for which lower frequency components are extracted, and an unstable defocus amount is obtained. Furthermore, when the subject pattern is moved to the outside, the contrast included in the calculation range decreases, instability increases, and if the pattern is moved to far, focus detection becomes impossible.

If the narrow region corresponding to the calculation range for filter processing data having high frequency components extracted is taken as the focus detection area, and a focus detection frame is displayed on the finder screen of the camera, focus detection carried out outside the focus detection frame will result in a defocus amount that is unstable. On the other hand, if the wide region corresponding to the calculation range for filter processing data having low frequency extracted is taken as the focus detection area, and a focus detection frame is displayed on the finder screen of the camera, since focus detection is carried out while a portion of the subject contrast is outside the frame, instability results.

In focus detection devices that do not perform filter processing, or that only carry out filter processing that removes frequency components higher than the Nyquist frequency, the influence of noise is less in the narrow calculation range than in the wide calculation range. As a result, the defocus amount obtained through the wide calculation range becomes unstable compared to the defocus amount obtained through the narrow calculation range, and the same problem occurs as described above.

In focus detection devices in which it is possible to switch between a wide mode and a spot mode, the calculation ranges for filter processing having high frequency components extracted may be variable. However, when the calculation range for filter processing data having low frequency components extracted is narrowed because the device is in the spot mode, when the subject consists of low frequency components, the contrast included in the calculation range decreases by the amount that the calculation range has become narrow. This can result in an unstable defocus amount with focus detection becoming impossible, and different focus detection capabilities for subjects with only low frequency components in the wide and spot modes. Therefore, if one decides to continually use a wide calculation range regardless of the mode, the perceived focus detection area will widen as described above, even in the spot mode, and there will be virtually no difference from the focus detection area in the wide mode.

Another problem will be described using FIG. 23. FIG. 23 shows the image sensor output when focusing is performed on a subject such as two chimneys. The contrast is formed only at the two ends of the image sensor array. There is no contrast in the calculating range using data for which filter processing with s=2 is performed, and detection becomes impossible since the maximum shift number lmax is small. However, since the maximum shift number lmax is large for filter processing data with s=8, when the shift amount L is large, the right side row A contrast, for example, coincides with the left side row B contrast, and the defocus amount ends up being calculated based on the correlation amount at a large shift amount even though the system is in the focused condition. This results in so-called false focus, in which the photo lens focuses in an abnormally blurred condition.

This problem may be resolved by decreasing the maximum shift number lmax in the correlation calculation of Formula 1. However, with this solution, when the defocus amount is large as shown in FIG. 21, focus detection becomes impossible.

SUMMARY OF THE INVENTION

An object of the present invention is to provide a focus detection device in which reliable defocus amounts are obtained, detection capability for low frequency subjects does not decrease, detection efficiency does not decrease for large defocus amounts, and false focussing and hunting are prevented. In addition, it is an object of the invention to provide a focus detection device that can switch between a spot mode and a wide mode wherein the difference between the focus detection areas of the wide mode and the spot mode is clear and there is no difference in the detection capabilities of the two modes for low frequency subjects.

In order to achieve the above and other objects of the invention, a focus detection device in accordance with a first embodiment of the invention includes an output device that outputs a pair of signal strings and includes at least a pair of photoelectric converting element arrays. A focus detection optical system conducts a pair of light rays from a subject that has passed the photo lens to the pair of photoelectric converting element arrays. A calculation range setting device sets a range of signals within the pair of signal strings and a focus detection calculating device calculates a focus adjustment condition for the photo lens based on the signal range set by the calculation range setting device. A contrast calculation device calculates a contrast based on signals of at least one of the signal strings that are excluded from the signal range set by the calculation range setting device, wherein the operation of the focus detection calculating device is dependent upon the calculated contrast.

In accordance with another embodiment of the invention, the focus detection device includes a filter that extracts a pair of signal strings having a predetermined frequency component from a pair of signal strings output by the photoelectric converting element arrays, wherein the extracted pair of signal strings are the signal strings output by the output device.

In accordance with a still further embodiment, if the calculated contrast exceeds a specified value, the focus detection calculating device will not carry out a focus detection calculation based on signal strings having components less than a predetermined frequency.

In accordance with another embodiment, if a calculated contrast exceeds a specified value, the focus detection calculating device narrows a shift range for a focus detection calculation based on the signal strings having components less than a predetermined frequency.

In accordance with a still further embodiment, a reliability evaluating device is provided that compares a value calculated by the focus detection calculating device with a pre-set threshold value and evaluates the reliability of a calculated defocus amount. If a calculated contrast exceeds a specified value, the reliability evaluating device changes the threshold value for the focus detection calculation based on the pair of signal strings having components less than a predetermined frequency.

In accordance with another embodiment, if a calculated contrast exceeds a specified value, the calculation range setting device narrows the range for a focus detection calculation based on the pair of signal strings that having lower frequency components.

BRIEF DESCRIPTION OF THE DRAWINGS

The invention will be described in detail with reference to the following drawings in which like reference numerals refer to like elements and wherein.

DETAILED DESCRIPTION OF PREFERRED EMBODIMENTS

Preferred embodiments of the present invention are described hereafter with reference to the drawings.

Figure 1:
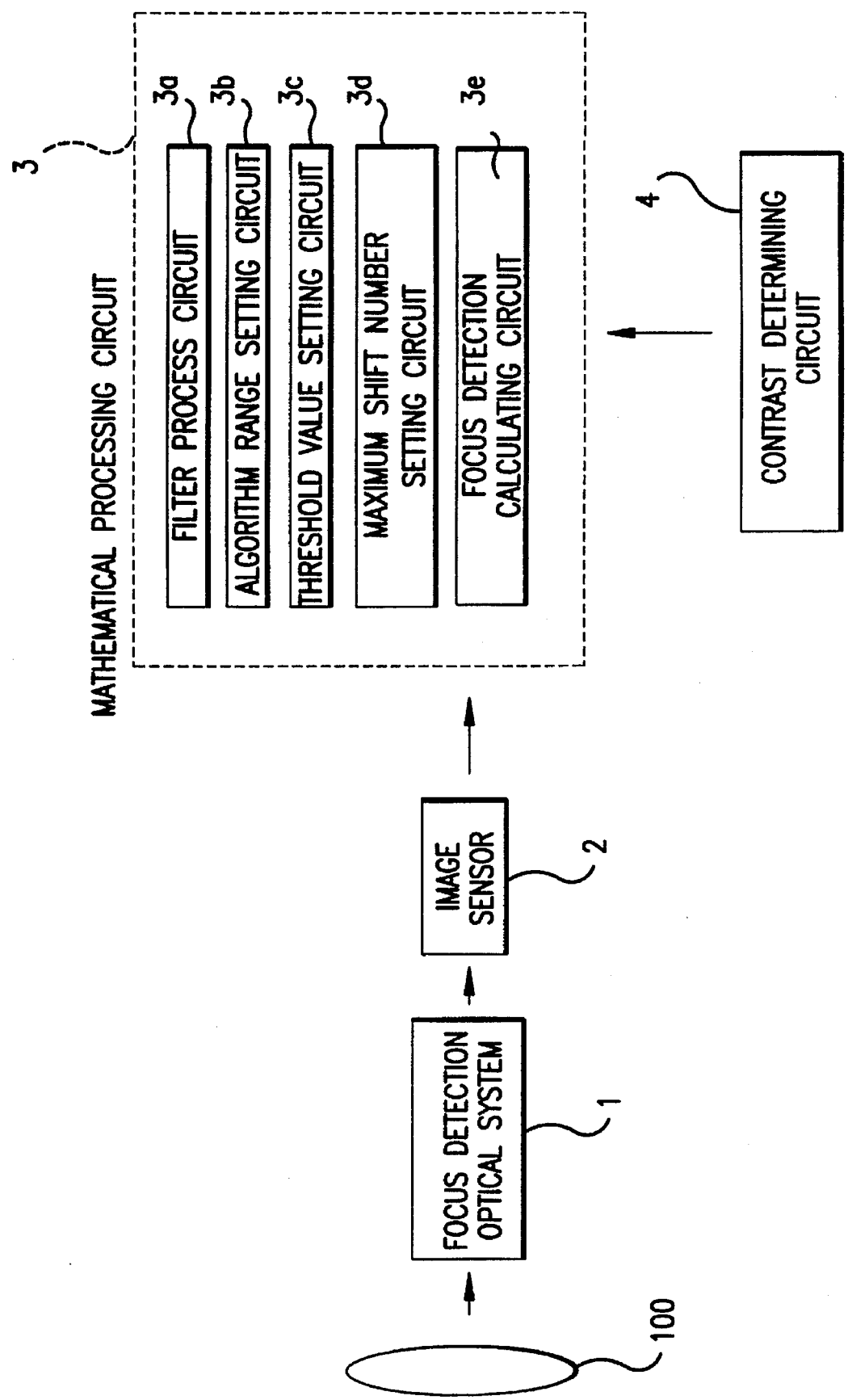
FIG. 1 is a block diagram illustrating the structure according to a first embodiment of the invention.

FIG. 1 is a block diagram that shows the structure of a first embodiment.

Figure 14:
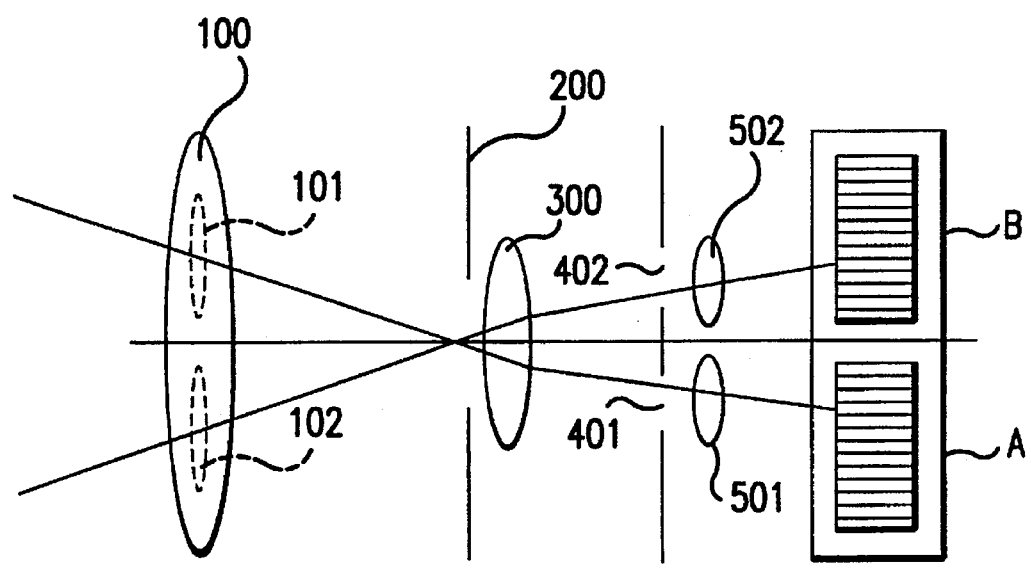
FIG. 14 is a schematic diagram illustrating the structure of a conventional focus detection optical system.
Figure 15A:
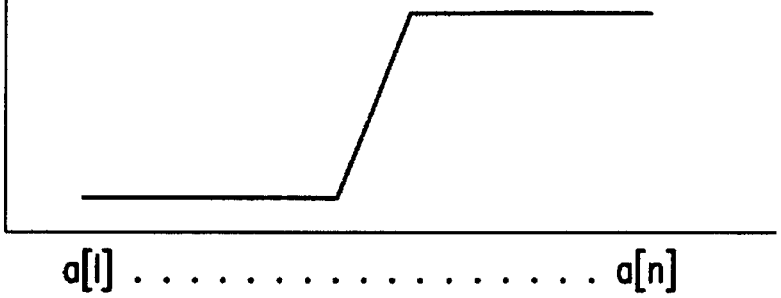
FIGS. 15(a)–15(c) are graphs describing a conventional focus detection calculation.
Figure 15B:
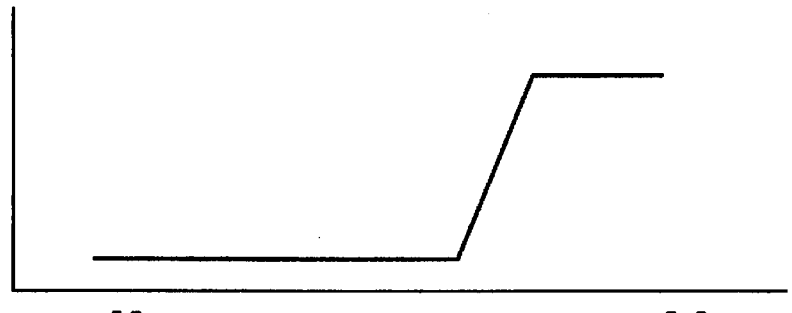
Figure 15C:
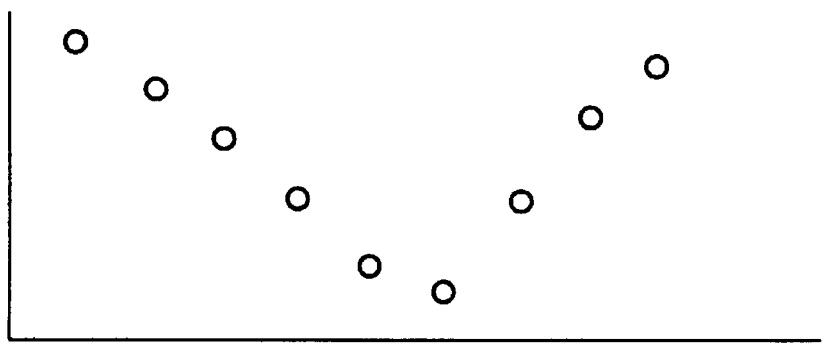
Figure 16A:
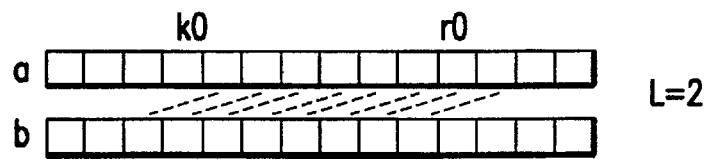
FIGS. 16(a)–16(e) are schematic diagrams describing a conventional correlation calculations for various shift amounts.
Figure 16B:
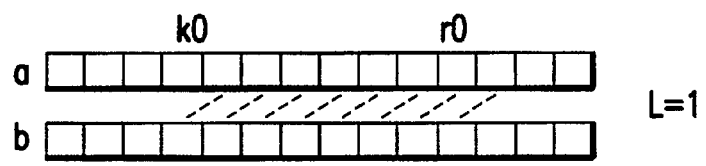
Figure 16C:
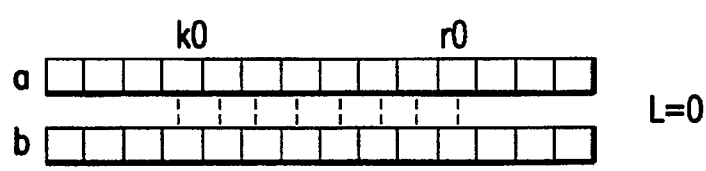
Figure 16D:
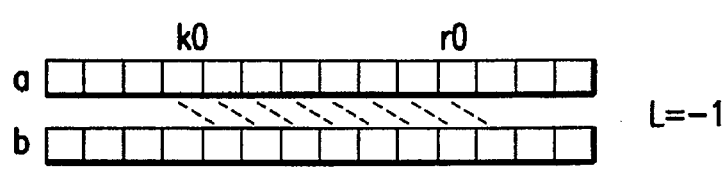
Figure 16E:
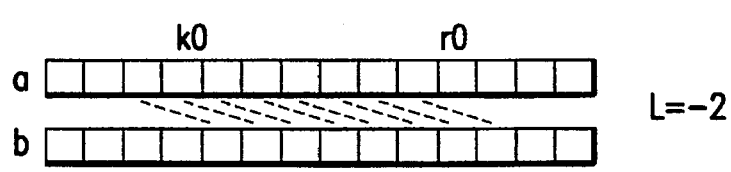
Figure 17:
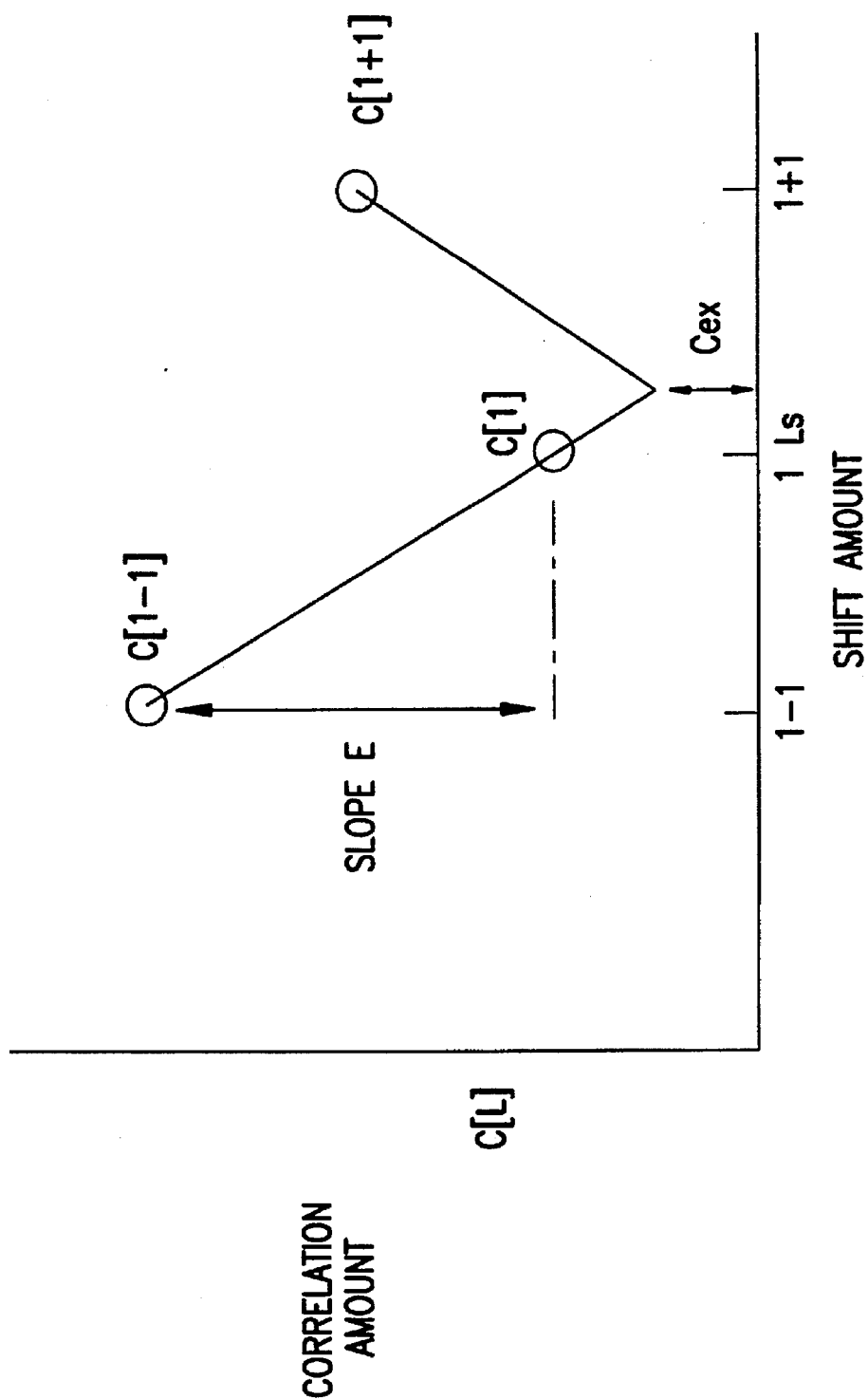
FIG. 17 is a graph illustrating a conventional focus detection calculation.

The focus detection optical system 1 is an optical system that conducts light from a subject that has passed a photo lens 100 to the image sensor 2. The focus detection optical system is formed, for example, by a field of field mask 200, a field lens 300, aperture stops 401 and 402, and re-imaging lenses 501 and 502, as shown in FIG. 14. The image sensor 2 includes a pair of image sensor arrays, e.g., rows A and B. Each array may consist of, for example, 52 photoelectric converting elements. The arrays output signal strings a[i] and b[i] corresponding to rows A and B, respectively, wherein each signal string consists of 52 data bits.

The mathematical processing circuit 3 includes a filter processing circuit 3a, a calculation range setting circuit 3b, a threshold value setting circuit 3c, a maximum shift number setting circuit 3d, and a focus detection calculating circuit 3e.

The filter processing circuit 3a performs a filter procedure according to Formula 7 and Formula 8 for the output signal strings a[i] and b[i] of the image sensor 2 and outputs filter processing data Fa[i] and Fb[i]. The output signal strings a[i] and b[i] are filtered according to Formula 7 to remove high frequency components above the Nyquist frequency. This filtering procedure produces filter processing data Pa[i] and Pb[i], for each of which 50 high frequency components have been cut. Further filter processing data Fa[i] and Fb[i] are generated according to Formula 8, wherein Fa[i] and Fb[i] each having 46 data bits when s=2, 42 data bits when s=4, and 34 data bits when s=8.

Figure 2A:
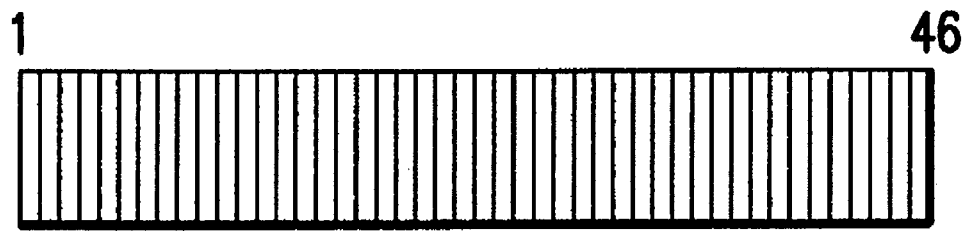
FIGS. 2(a)–2(c) are schematic diagrams illustrating the calculation ranges of the first embodiment.
Figure 2B:
Figure 2C:
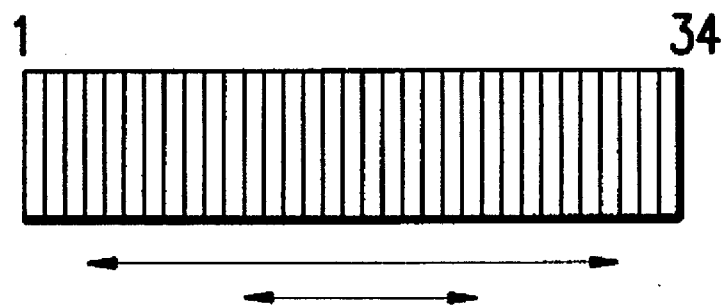

The calculation range setting circuit 3b establishes the calculation range by setting the initial value k0 and the final value r0 according to the kind of filter processing. FIGS. 2(a)–2(c) show the calculation ranges set for cases in which s=2, s=4, and s=8, respectively, in Formula 8. When s=2, k0=17 and r0=30; when s=4, k0=16 and r0=27; when s=8, k0=4 and r0=31. The focus detection frame displayed on the finder screen of the camera is taken as the area that corresponds to the above-mentioned calculation range for s=2. Hereafter, this area is referred to simply as the focus detection area. In the second operation (described hereafter), in the case shown in FIG. 2(c) for which s=8, when it is determined through the contrast determining circuit 4 (described hereafter) that a strong contrast exists outside the focus detection area, the range of k0=13 and r0=22, which is shown by the dotted line and which is different from the above-mentioned calculation range, is used as the calculation range.

The threshold value setting circuit 3c sets the threshold values E1 and G1 used in Formula 6. The values of the threshold values E1 and G1 differ according to the kind of filter processing, and are taken as E1=Ea and G1=Ga when s=2, E1=Eb and G1=Gb when s=4, and E1=Ec and G1=Gc when s=8. These threshold values have the following relationships:

$Ea \leq Eb \leq Ec,$ $Gc \leq Gb \leq Ga$

In the third operation (described hereafter), when it is determined through the contrast determining circuit 4 that a strong contrast exists outside the focus detection area, the threshold value for s=8 is set to a value that is more restrictive than the above-mentioned Ec.

The maximum shift number setting circuit 3d sets the maximum shift number lmax in Formula 1. The maximum shift number lmax that is set differs according to the kind of filter processing. lmax=la when s=2, lmax=lb when s=4, and lmax=lc when s=8. These maximum shift numbers have the following relationship:

$$la < lb < lc \tag{10}$$

In the second and third operations, (described hereafter), when it is determined through the contrast determining circuit 4 that a strong contrast exists outside the focus detection area, the maximum shift number for s=8 is set to a value that is smaller than the above-mentioned lc.

The focus detection calculating circuit 3e carries out focus detection calculations according to Formula 1–6, using the filter processing data Fa[i] and Fb[i]. The focus detection calculation circuit 3e calculates the focus adjustment condition of the photo lens 100, i.e., the defocus amount.

The contrast determining circuit 4 detects the contrast of the data at both sides of at least one of the image sensor array rows A and B, and determines whether there is a strong contrast outside the focus detection area. Specifically, contrast determining circuit 4 calculates the contrast in each region to the left and right of the calculation area of at least one of the filter processing data Fa[i] and Fb[i] obtained through the filter processing of Formula 8 using s=2 (here, the case will be described in which only Fa[i] is used). The difference between the maximum value and minimum value of the data (referred to hereafter as the PP value) is also calculated. The contrast determining circuit 4 then determines whether there is a strong contrast outside the focus detection area based on the obtained contrast and PP value. The calculation range for s=2 is from 17 to 30, and two contrast values Cnt[1] and Cnt[2] are calculated through Formula 11 in two ranges, i.e., 3 to 16 and 31 to 44, which are to the left and right, respectively, of this calculation range.

$Cnt[1] = \Sigma |Fa[i] - Fa[i+1]|$, where $\Sigma$ indicates the summation from i=3 to 15.

$Cnt[2] = \Sigma |Fa[i] - Fa[i+1]|$ where $\Sigma$ indicates the summation from i=31 to 43 \hfill (11)

In Formula 11, when noise overlaps the output signal of the image sensor 2, Cnt[1] and Cnt[2] become comparatively large values even when the subject is exactly the same pattern. However, by replacing the values with 0 when the absolute value of Fa[i]–Fa[i+1] is smaller than a specified value, the noise components can be removed.

In addition, the PP values PtP[1] and PtP[2] are calculated in each range to the left and right of the calculation range as follows:

$PtP[1] = \text{Max } \{Fa[3] \text{ to } Fa[16]\} - \text{Min } \{Fa[3] \text{ to } Fa[16]\}$, $PtP[2] = \text{Max } \{Fa[31] \text{ to } Fa[44]\} - \text{Min } \{Fa[31] \text{ to } Fa[44]\}$ \hfill (12)

The contrast values Cnt[1] and Cnt[2] and the PP values PtP[1] and PtP[2] are then compared with specified threshold values STh1 and STh2. When the following conditions are satisfied, it is determined that a strong contrast exists outside the focus detection area. If the following conditions are not satisfied, it is determined that a strong contrast does not exist outside the focus detection area.

$Cnt[1] > STh1$, or, $Cnt[2] > STh1$, or, $PtP[1] > STh2$, or, $PtP[2] > STh2$, where it is desirable that $STh2 < STh1$ \hfill (13)

Figure 18A:
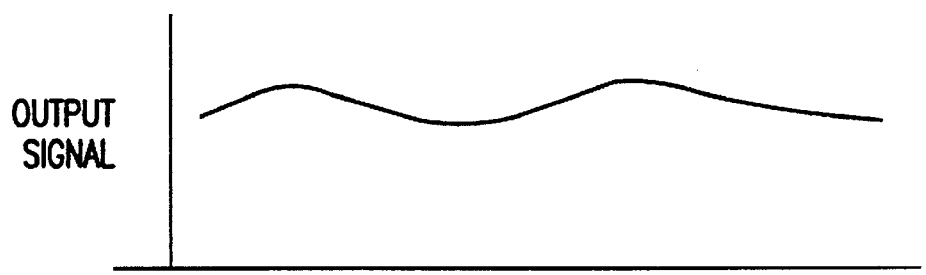
FIGS. 18(a)–18(c) are graphs that shows an example of a subject pattern that consists only of low frequency components.
Figure 18B:
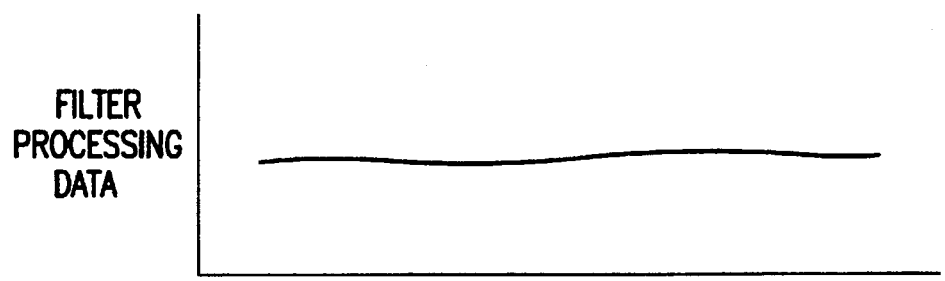
Figure 18C:
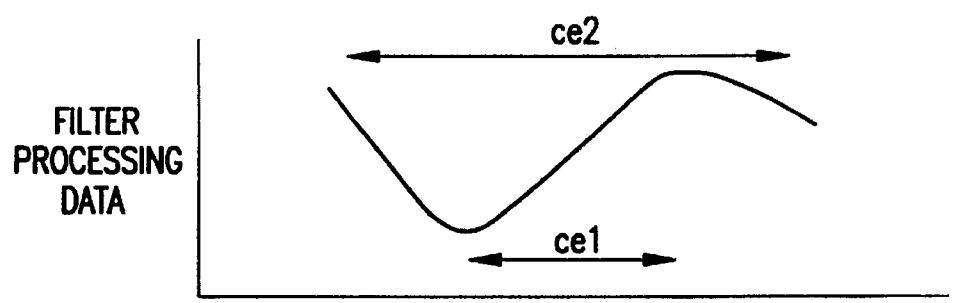
Figure 19A:
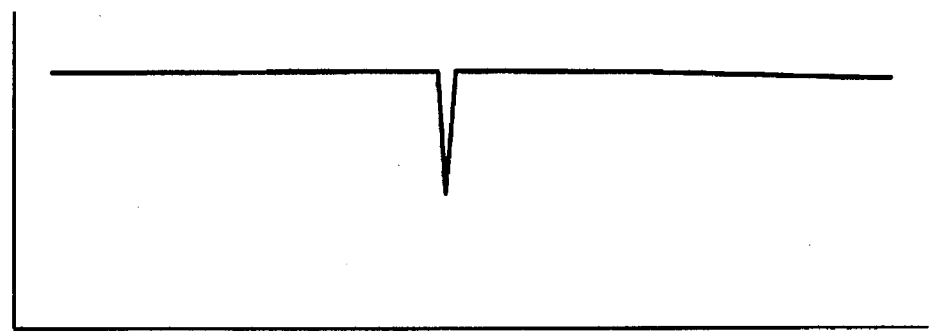
FIGS. 19(a)–19(c) are graphs that shows an example of a subject pattern that consists only of high frequency components.
Figure 19B:
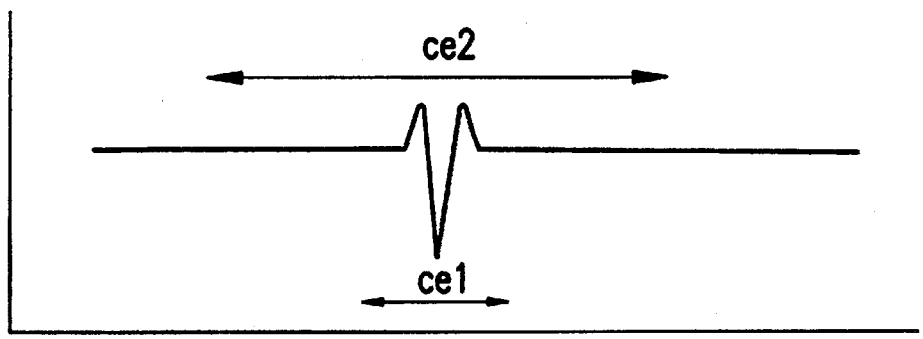
Figure 19C:
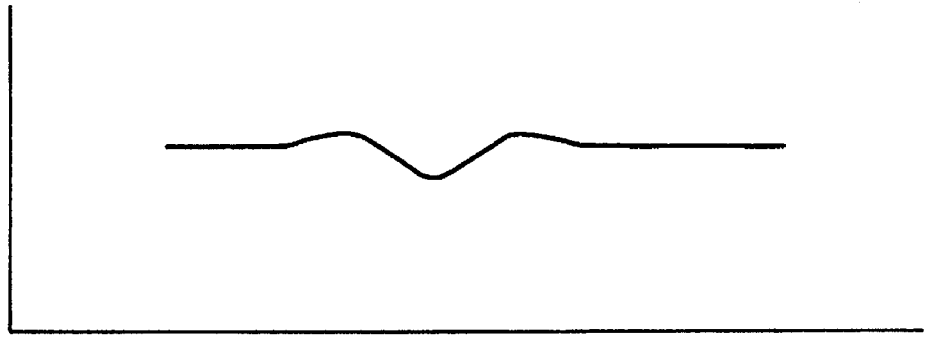
Figure 20A:
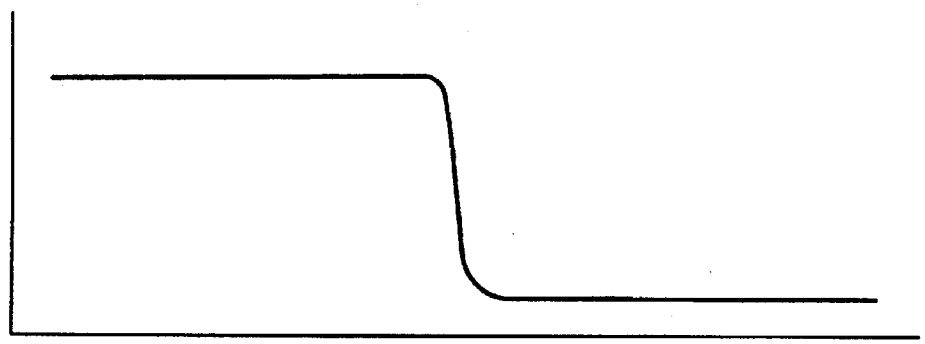
FIGS. 20(a)–20(c) are graphs that shows an example of a subject pattern that includes high frequency components and low frequency components.
Figure 20B:
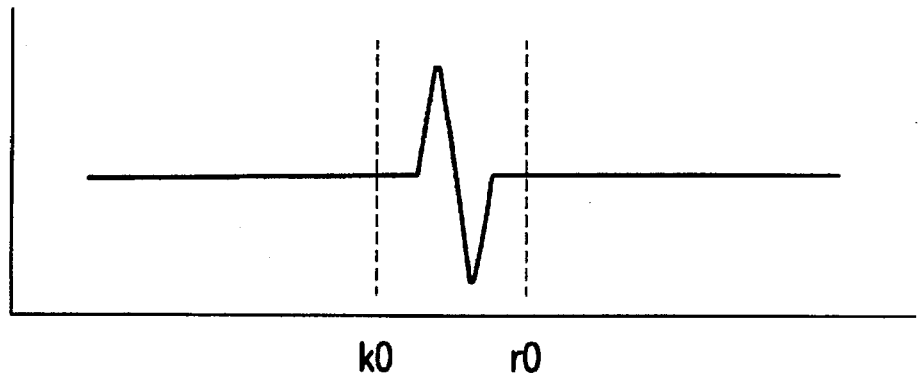
Figure 20C:
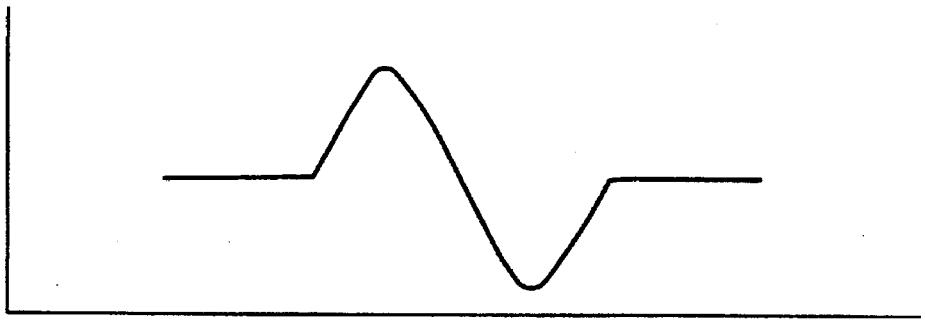

In the case of a subject consisting only of low frequency components, such as the subject pattern shown in FIG. 18, the contrast using filter processing data for which high frequency components have been extracted with s=2 disappears completely, and it is determined through the above-mentioned evaluation that there is no strong contrast pattern outside the focus detection area.

Figure 21A:
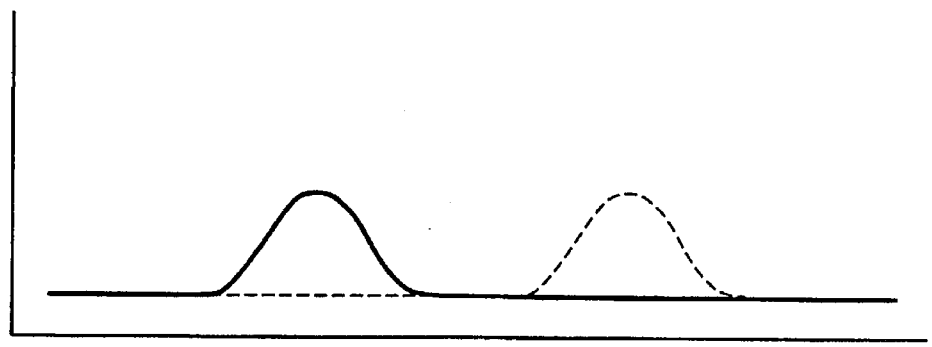
FIGS. 21(a)–21(c) are graphs that shows an example of a subject pattern when the defocus amount is large.

When the defocus is large, such as in the subject pattern shown in FIG. 21(a), since the patterns of the rows A and B shift together, an area with contrast comes into existence outside the focus detection area. However, since the subject image is blurred because the defocus amount is large, high frequency components are not included, the contrast disappears when filter processing data is used for which high frequency components have been extracted with s=2, and it is determined through the above-mentioned evaluation that there is no strong contrast pattern outside the focus detection area.

Figure 22A:
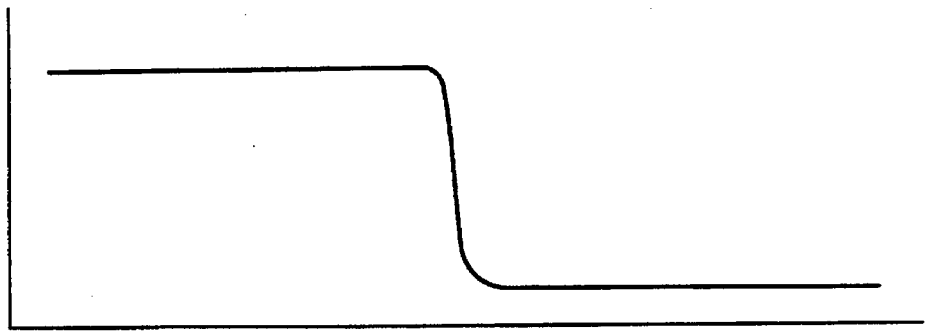
FIGS. 22(a)–22(c) are graphs that shows a case in which the subject pattern is shifted to the side.
Figure 23:
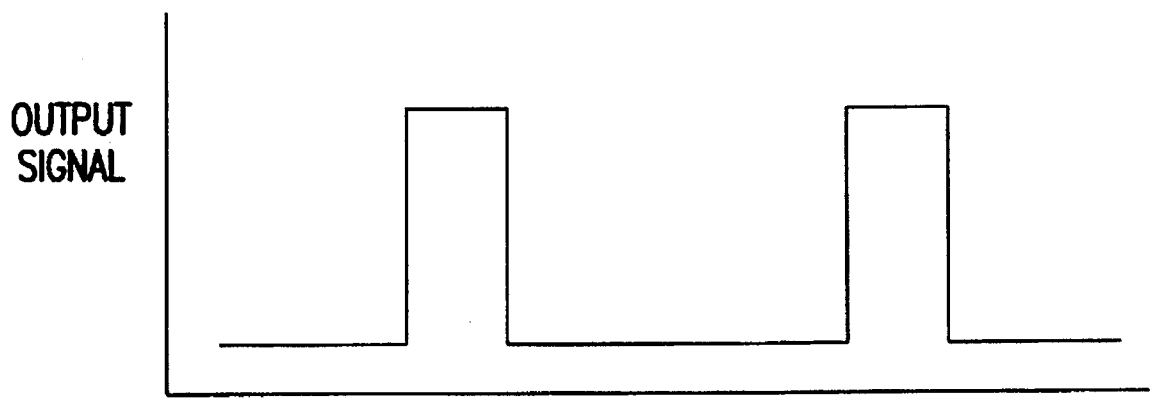
FIG. 23 is a graph illustrating the case in which a subject pattern exists only at the sides of the sensor.

Conversely, in the focused condition, such as the patterns shown in FIGS. 22(a) and 23, since high frequency components are included, a contrast is obtained with filter processing data for which high frequency components have been extracted with s=2, and it is determined through the above-mentioned evaluation that there is a strong contrast pattern outside the focus detection area.

Thus, by using filter processing data for which high frequency components are extracted for the contrast evaluation, in cases in which the defocus amount is large and a blurred subject image exists outside the focus detection area it will be determined that there is no strong contrast.

The mathematical processing circuit 3 and the contrast determining circuit 4 may be embodied in a micro-computer.

The operation of the first embodiment will be described with reference to FIGS. 3–5.

Figure 3:
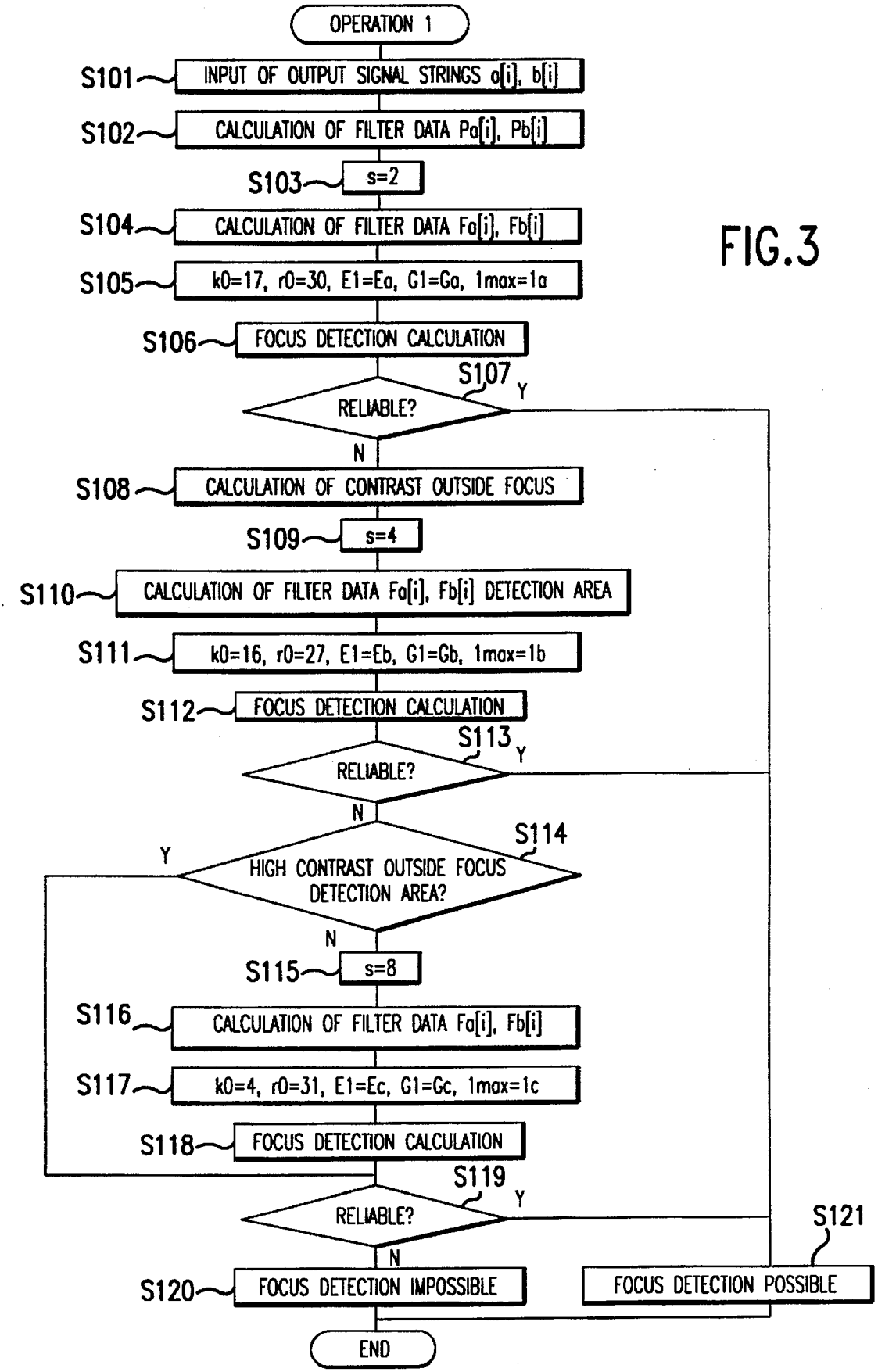
FIG. 3 is a flow chart of the first operation of the first embodiment.

FIG. 3 is a flow chart that shows the first operation of the first embodiment. In this first operation, when it is determined through the contrast determining circuit 4 that there is a strong contrast outside the focus detection area, a focus detection calculation based on filter processing data for which low frequency components are extracted is prevented.

In step S101, output signal strings a[i] and b[i] are input from the image sensor 2. The program then proceeds to step S102 and calculates filter processing data Pa[i] and Pb[i]

through Formula 7. In step S103, the value of s in Formula 8 is set to 2, and in step S104, filter processing data Fa[i] and Fb[i] are calculated by executing the filter calculation according to Formula 8. In step S105, the following values are set: initial value k0=17, final value r0=30, threshold value E1=Ea, threshold value G1=Ga, and the maximum shift number lmax=la. In step S106, the focus detection calculations of Formulas 1-6 are executed using the calculation range, threshold values, and maximum shift number set in the preceding step.

In step S107, it is determined whether a reliable defocus amount is obtained. If a reliable defocus amount is obtained, the program advances to step S121, focus detection is determined to be possible, and the operation ends. Conversely, if a reliable defocus amount is not obtained, the program proceeds to step S108, calculates the contrast outside the focus detection area and the PP value through Formulas 11 and 12, respectively, and determines through Formula 13 whether a strong contrast exists outside the focus detection area. In step S109, the s value in Formula 8 is set to 4. The program proceeds to step S110 and calculates filter processing data Fa[i] and Fb[i] according to Formula 8. In step S111, the following values are set: initial value k0=16, final value r0=27, threshold value E1=Eb, threshold value G1=Gb, and the maximum shift number lmax=lb. In step S112, the focus detection calculations of Formulas 1-6 are executed using the calculation range, threshold values, and maximum shift number set in the preceding step.

In step S113, it is determined whether a reliable defocus amount is obtained. If a reliable defocus amount is obtained, the program advances to step S121, focus detection is determined to be possible, and the operation ends. If a reliable defocus amount is not obtained, the program proceeds to step S114. In step S114, if it is determined in step S108 that a strong contrast does not exist outside the focus detection area, the program proceeds to steps S115–S118, in which a focus detection calculation is carried out based on filter processing data for which lower frequency components are extracted. In step S115, the s value in Formula 8 is set to 8. The program proceeds to step S116 and calculates filter data Fa[i] and Fb[i] according to Formula 8. In step S117, the following values are set: initial value k0=4, final value r0=31, threshold value E1=Ec, threshold value G1=Gc, and the maximum shift number lmax=lc. In step S118, the focus detection calculations of Formulas 1-6 are executed using the calculation range, threshold values, and maximum shift number set in the preceding step. Next, in step S119, it is determined whether a reliable defocus amount is obtained. If a reliable defocus amount is obtained, the program proceeds to step S121, focus detection is possible, and the operation ends. Conversely, if a reliable defocus amount is not obtained, the program proceeds to step S120, focus detection is determined to be impossible, and the operation ends.

If it is determined in step S114 that a strong contrast does exist outside the focus detection area, a focus detection calculation based on filter processing data for which even lower frequency components are extracted is prevented, the program advances to step S120, focus detection is determined to be impossible, and the operation ends.

Figure 21B:
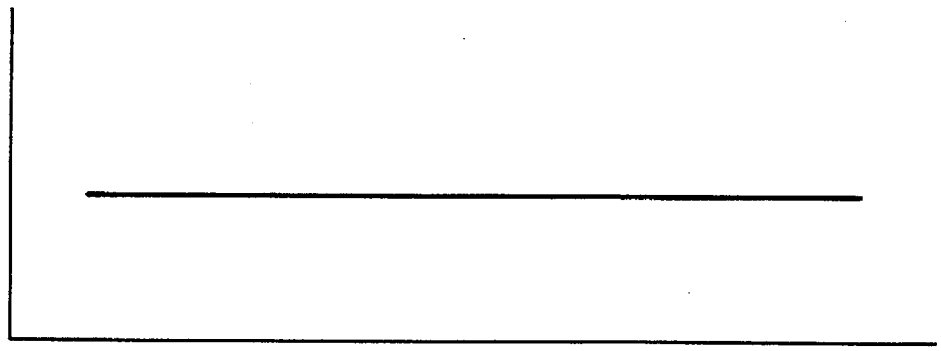
Figure 21C:
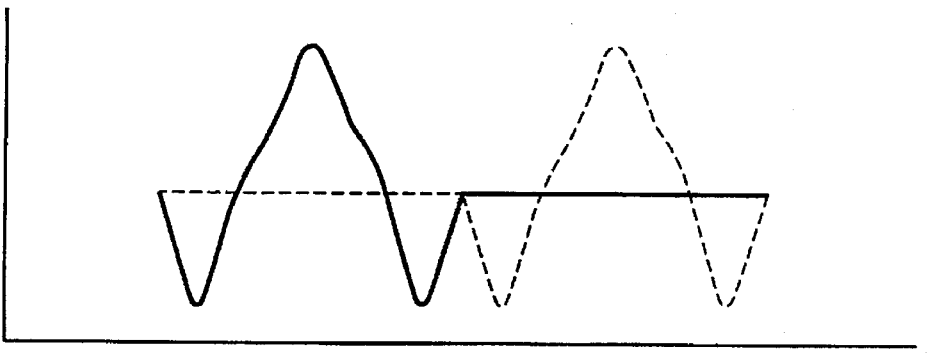

According to the first operation, in the case of the subject patterns shown in FIG. 22(a) and FIG. 23, since a focus detection calculation based on filter processing data for which low frequency components have been extracted with s=8 is not carried out because strong contrast exists outside the focus detection area, focus detection becomes impossible. In the case of the subject patterns shown in FIG. 21 and FIG. 18, since a focus detection calculation is executed based on filter processing data for which low frequency components have been extracted with s=8 because strong contrast does not exist outside the focus detection area, focus detection becomes possible and a defocus amount can be detected.

Steps S101–S104, S109, S110, S115, and S116 are operations of the filter processing circuit 3a; steps S105, S111, and S117 are operations of the calculation range setting circuit 3b, the threshold value setting circuit 3c, and the maximum shift number setting circuit 3d. Steps S108 and S114 are operations of the contrast determining circuit 4, and all other steps are operations of the focus detection calculating circuit 3e.

Figure 4:
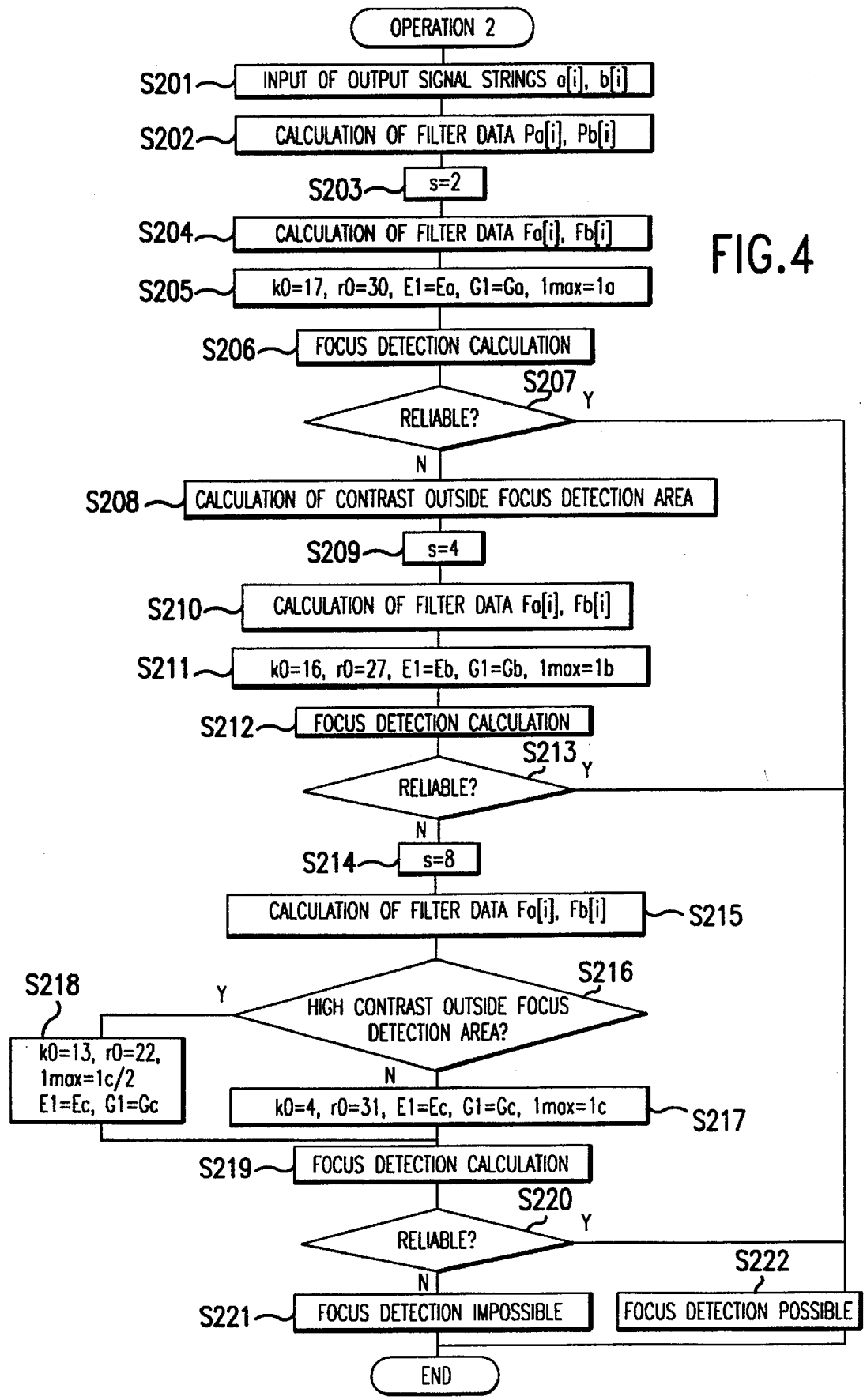
FIG. 4 is a flow chart of the second operation of the first embodiment.

FIG. 4 is a flow chart that shows a variation of the first operation of the first embodiment (hereafter called the second operation of the first embodiment). In the second operation, when it is determined through the contrast determining circuit 4 that there is a strong contrast outside the focus detection area, the calculation range is narrowed in the focus detection calculation based on filter processing data for which low frequency components have been extracted with s=8, the maximum shift number is decreased, and the shift range is narrowed.

In step S201, output signal strings a[i] and b[i] are input from the image sensor 2. The program then proceeds to step S202 and calculates filter processing data Pa[i] and Pb[i] through Formula 7. In step S203, the value of s in Formula 8 is set to 2, and in step S204, filter processing data Fa[i] and Fb[i] are calculated by executing the filter calculation according to Formula 8. In step S205, the following values are set: initial value k0=17, final value r0=30, threshold value E1=Ea, threshold value G1=Ga, and the maximum shift number lmax=la. In step S206, the focus detection calculations of Formulas 1-6 are executed using the calculation range, threshold values, and maximum shift number set in the preceding step.

In step S207, it is determined whether a reliable defocus amount is obtained. If a reliable defocus amount is obtained, the program advances to step S222, focus detection is determined to be possible, and the operation ends. Conversely, if a reliable defocus amount is not obtained, the program proceeds to step S208. In step S208, the program calculates the contrast outside the focus detection area and the PP value through Formula 11 and Formula 12, respectively, and determines through Formula 13 whether a strong contrast exists outside the focus detection area. In step S209, the s value in Formula 8 is set to 4, and in step S210, filter processing data Fa[i] and Fb[i] are calculated by executing the filter calculation according to Formula 8. In step S211, the following values are set: initial value k0=16, final value r0=27, threshold value E1=Eb, threshold value G1=Gb, and the maximum shift number lmax=lb. In step S212, the focus detection calculations of Formulas 1-6 are executed using the calculation range, threshold values, and maximum shift number set in the preceding step.

In step S213, it is determined whether a reliable defocus amount is obtained. If a reliable defocus amount is obtained, the program advances to step S222, focus detection is determined to be possible, and the operation ends. Conversely, if a reliable defocus amount is not obtained, the program proceeds to step S214 and sets the s value to 8. Next, in step S215, filter processing data Fa[i] and Fb[i] are calculated by Formula 8. In step S216, if it is determined in the above-mentioned step S208 that strong contrast does not exist outside the focus detection area, the program proceeds to step S217, in which a wide calculation range and a large maximum shift number are set; if it is determined that strong contrast does exist outside the focus detection area, the program proceeds to step S218, in which a narrow calculation range and a small maximum shift number are set. In step S217, the following values are set: initial value k0=4, final value r0=31, threshold value E1=Ec, threshold value G1=Gc, and the maximum shift number lmax=lc. Alternatively, in step S218 the following values are set: initial value k0=13, final value r0=22, threshold value E1=Ec, threshold value G1=Gc, and the maximum shift number lmax=lc/2.

In step S219, the focus detection calculations of Formulas 1–6 are executed using the calculation range, threshold values, and maximum shift number set in the preceding step S217 or step S218. In step S220, it is determined whether a reliable defocus amount is obtained. If a reliable defocus amount is obtained, the program proceeds to step S222, focus detection is possible, and the operation ends. Conversely, if a reliable defocus amount is not obtained, the program proceeds to step S221, focus detection is determined to be impossible, and the operation ends.

Figure 22B:
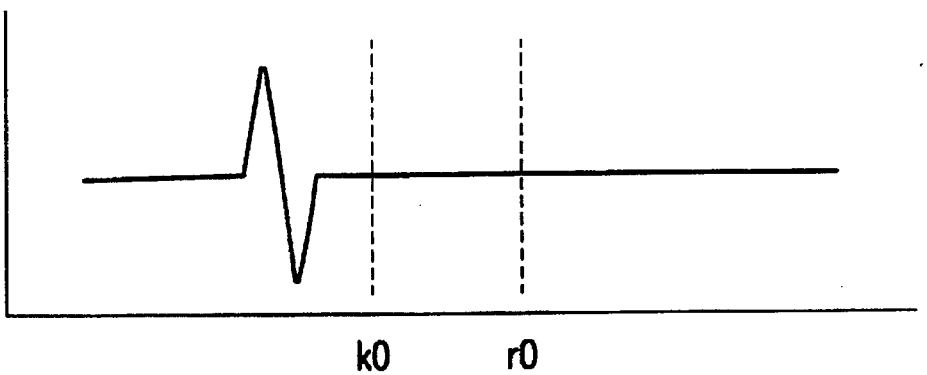
Figure 22C:
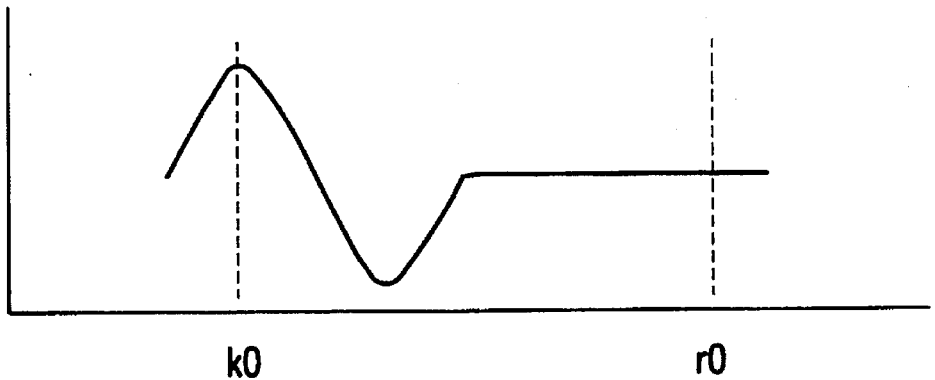

According to the second operation, in the case of the subject patterns shown in FIG. 22 and FIG. 23, since strong contrast exists outside the focus detection area, a focus detection calculation based on filter processing data for which low frequency components are extracted is carried out with a narrow calculation range and a small maximum shift number. In the case of the subject pattern shown in FIG. 22, since focus detection is carried out for an area with no contrast because the calculation range has become narrow, focus detection becomes impossible. In the case of the subject pattern shown in FIG. 23, since a correlation amount is not calculated for a shift amount that will result in false focus, focus detection becomes impossible through the setting of a small maximum shift number. In the case of the subject patterns shown in FIG. 21 and FIG. 18, since a focus detection calculation based on filter processing data for which low frequency components are extracted is carried out with a wide calculation range and a large maximum shift number because strong contrast does not exist outside the focus detection area, focus detection becomes possible and a defocus amount can be detected.

In the above-mentioned step S218, the example was shown in which the maximum shift number was decreased to ½ of the normal value. However, the decrease in the maximum shift number is not limited to this amount. Steps S201–S204, S209, S210, S214, and S215 are operations of the filter processing circuit 3a; steps S205, S211, S217, and S218 are operations of the calculation range setting circuit 3b, the threshold value setting circuit 3c, and the maximum shift number setting circuit 3d. Steps S208 and S216 are operations of the contrast determining circuit 4, and all other steps are operations of the focus detection calculating circuit 3e.

Figure 5:
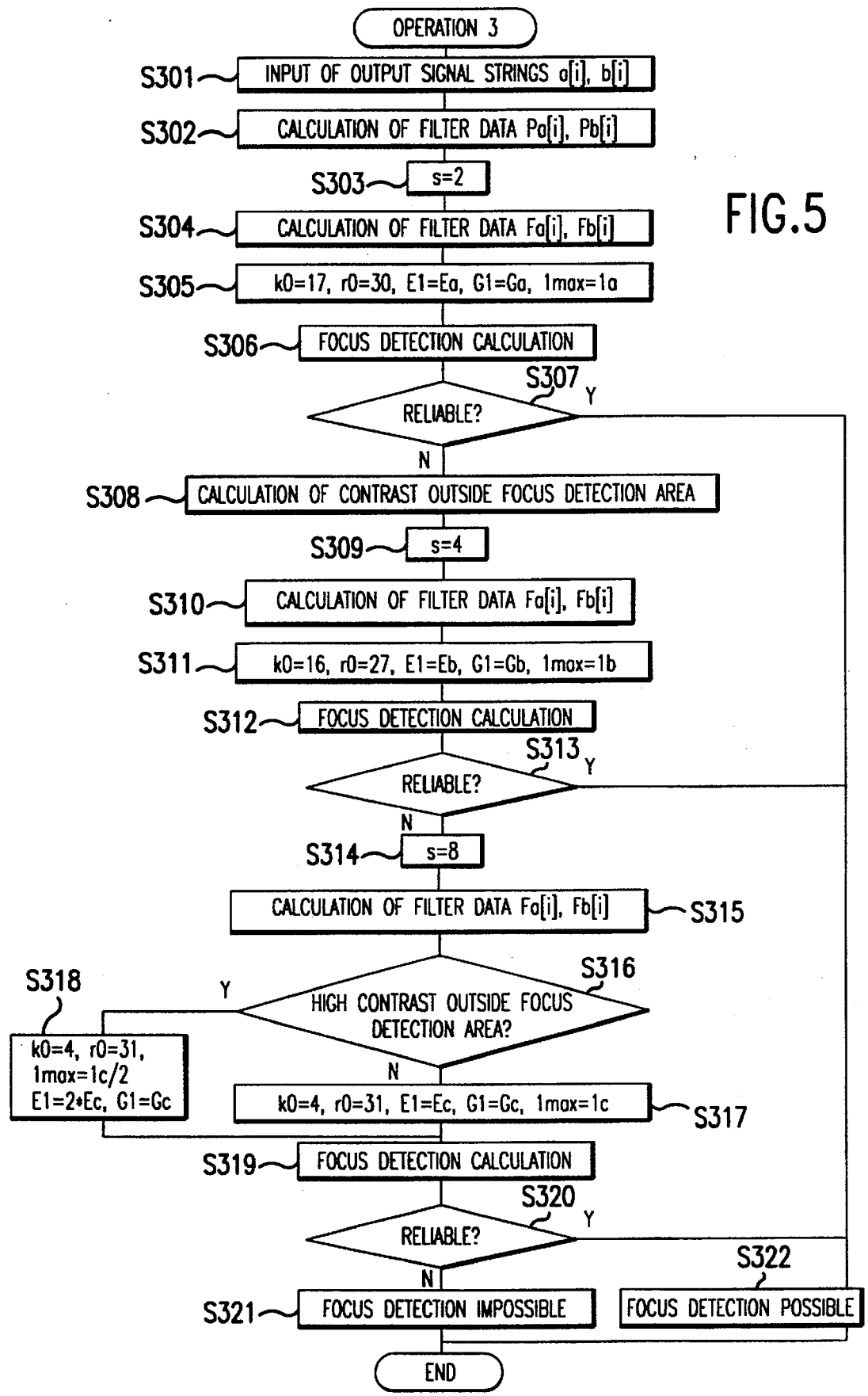
FIG. 5 is a flow chart of the third operation of the first embodiment.

FIG. 5 is a flow chart that shows another variation of the first operation of the first embodiment (hereafter called the third operation of the first embodiment). In this third operation, when it is determined through the contrast determining circuit 4 that there is a strong contrast outside the focus detection area, the threshold values are made more restrictive for the focus detection calculation based on filter processing data for which low frequency components are extracted, the maximum shift number is decreased, and the shift range is narrowed.

In step S301, output signal strings a[i] and b[i] are input from the image sensor 2. The program then proceeds to step S302 and calculates filter processing data Pa[i] and Pb[i] through Formula 7. In step S303, the value of s in Formula 8 is set to 2, and in step S304, filter processing data Fa[i] and Fb[i] are calculated by executing the filter calculation according to Formula 8. In step S305, the following values are set: initial value k0=17, final value r0=30, threshold value E1=Ea, threshold value G1=Ga, and the maximum shift number lmax=la. In step S306, the focus detection calculations of Formulas 1–6 are executed using the calculation range, threshold values, and maximum shift number set in the preceding step.

In step S307, it is determined whether a reliable defocus amount is obtained. If a reliable defocus amount is obtained, the program advances to step S322, focus detection is determined to be possible, and the operation ends. Conversely, if a reliable defocus amount is not obtained, the program proceeds to step S308, calculates the contrast outside the focus detection area and the PP value through Formula 11 and Formula 12, respectively, and determines through Formula 13 whether a strong contrast exists outside the focus detection area. In step S309, the s value in Formula 8 is set to 4, and in step S310, filter processing data Fa[i] and Fb[i] are calculated according to Formula 8. In step S311, the following values are set: initial value k0=16, final value r0=27, threshold value E1=Eb, threshold value G1=Gb, and the maximum shift number lmax=lb. In step S312, the focus detection calculations of Formulas 1–6 are executed using the calculation range, threshold values, and maximum shift number set in the preceding step.

In step S313, it is determined whether a reliable defocus amount is obtained. If a reliable defocus amount is obtained, the program advances to step S322, focus detection is determined to be possible, and the operation ends. Conversely, if a reliable defocus amount is not obtained, the program proceeds to step S314 and sets the s value to 8. In step S315, filter processing data Fa[i] and Fb[i] are obtained by executing the filter calculation according to Formula 8. In step S316, if it is determined in the preceding steps that strong contrast does not exist outside the focus detection area, the program proceeds to step S317, in which a normal threshold value and a large maximum shift number are set; if it is determined that strong contrast does exist outside the focus detection area, the program proceeds to step S318, in which a restrictive threshold value and a small maximum shift number are set. In step S317, the following values are set: initial value k0=4, final value r0=31, threshold value E1=Ec, threshold value G1=Gc, and the maximum shift number lmax=lc. Alternatively, in step S318 the following values are set: initial value k0=4, final value r0=31, threshold value E1=2xEc, threshold value G1=Gc, and the maximum shift number lmax=lc/2. In step S319, the focus detection calculations of Formulas 1–6 are executed using the calculation range, threshold values, and maximum shift number set in the preceding step S317 or step S318.

In step S320, it is determined whether a reliable defocus amount is obtained. If a reliable defocus amount is obtained, the program proceeds to step S322, focus detection is possible, and the operation ends. Conversely, if a reliable defocus amount is not obtained, the program proceeds to step S321, focus detection is determined to be impossible, and the operation ends.

According to the third operation, since strong contrast exists outside the focus detection area in the case of the subject patterns shown in FIG. 22 and FIG. 23, a focus detection calculation based on filter processing data having low frequency components extracted is carried out with a restrictive threshold value and a small maximum shift number. In the case of the subject pattern shown in FIG. 22, since the threshold value becomes restrictive, there is no reliability even though contrast exists in the calculation range, and focus detection becomes impossible. In the case of the subject pattern shown in FIG. 23, since a correlation amount is not calculated for a shift amount that will result in false focus, focus detection becomes impossible through the setting of a small maximum shift number. In the case of the subject patterns shown in FIG. 21 and FIG. 18, since strong contrast does not exist outside the focus detection area, a focus detection calculation based on filter processing data having low frequency components extracted is carried out with a restrictive threshold value and a large maximum shift number. Consequently, focus detection becomes possible and a defocus amount can be detected.

In step S318, only the threshold value E1 was set to be restrictive. However, the threshold value G1 may also be set to be restrictive.

In addition, in step S318, the restrictive threshold value was set to twice the normal threshold value. However, the restrictive threshold value is not limited by the above-mentioned embodiment.

Furthermore, instead of using the numerical value E, the contrast for one of a pair of data may be calculated, and the evaluation may be carried out using this value.

Steps S301–S304, S309, S310, S314, and S315, are operations of the filter processing circuit 3a; steps S305, S311, S317, and S318 are operations of the calculation range setting circuit 3b, the threshold value setting circuit 3c, and the maximum shift number setting circuit 3d. Steps S308 and S316 are operations of the contrast determining circuit 4, and all other steps are operations of the focus detection calculating circuit 3e.

In the third operation, a focus detection calculation based on filter processing data having low frequency components extracted is carried out with a wide calculation range even if strong contrast exists outside the focus detection area. However, it is also acceptable to set a narrow calculation range, as in the second operation.

In the first embodiment, a first operation, and two variations thereof (i.e. the second and third operations) are disclosed as separately provided in a camera. However, it is also possible to provide any two or all three of the operations usable together in a single camera. Further, in the first through third operations described above, filters for processing the output signal strings were provided. However, the invention may be applied to focus detection devices directly using the output signal strings without performing filter processing, or only using limited filter processing, e.g., removal of frequency components higher than the Nyquist frequency. In these devices, when a focus detection calculation is carried out in a narrow focus detection area and a reliable defocus amount is not obtained, the contrast outside the focus detection area is determined and the focus detection calculation is either prevented from once again being carried out with a wide focus detection range based on the determined contrast, or the threshold value is made to be more restrictive, or other such steps.

Figure 6:
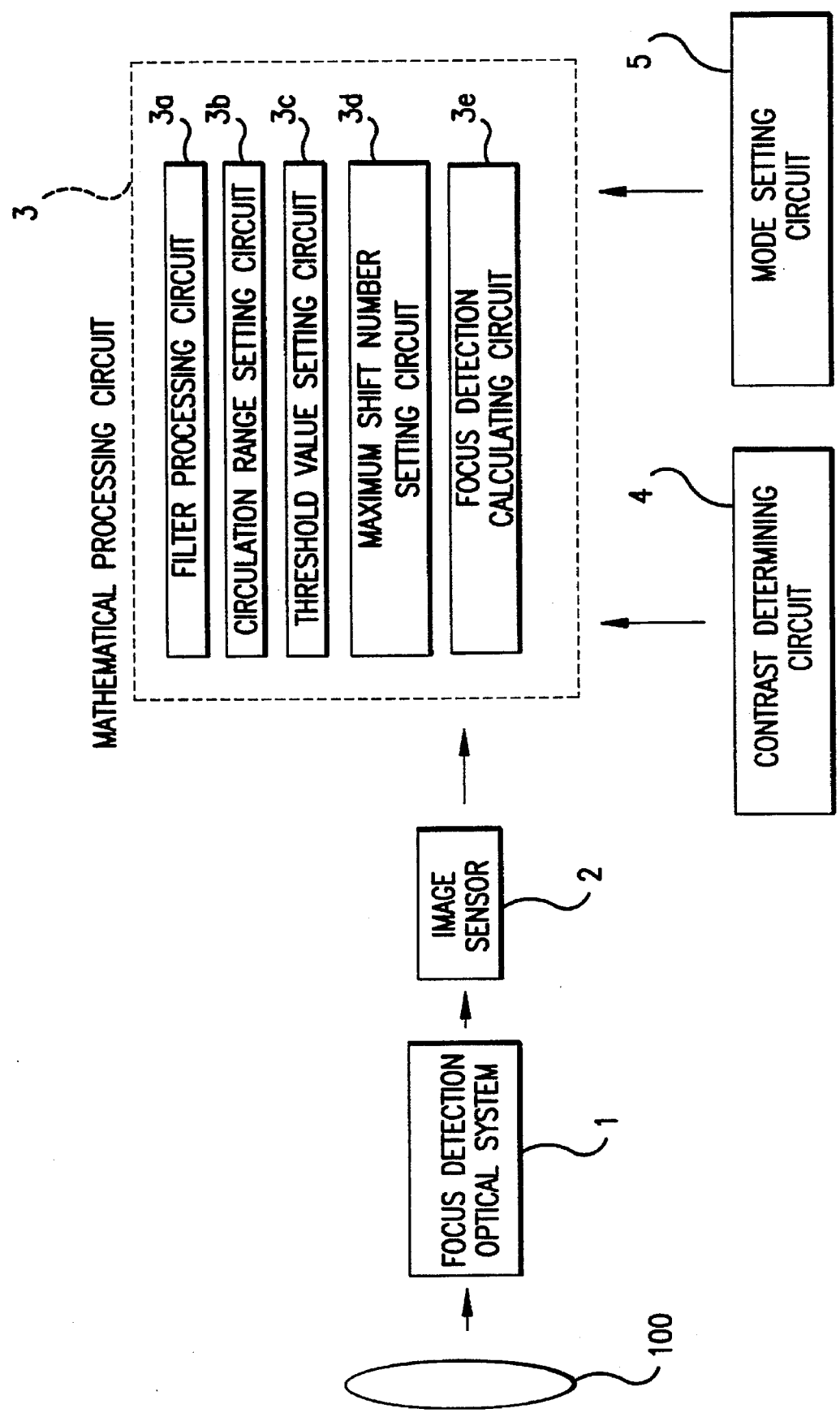
FIG. 6 is a block diagram illustrating the structure of the second embodiment.

FIG. 6 is a block diagram that shows the structure of a second embodiment.

The second embodiment is the same as the first embodiment, but with a mode setting circuit 5 added which selectively sets the wide mode and the spot mode. The mode setting circuit 5 comprises, for example, a switch or the like that is operated manually by the photographer. The focus detection optical system 1 and the image sensor 2 are the same as in the first embodiment.

As in the first embodiment, the mathematical processing circuit 3 includes a filter processing circuit 3a, a calculation range setting circuit 3b, a threshold value setting circuit 3c, a maximum shift number setting circuit 3d, and a focus detection calculating circuit 3e. The filter processing circuit 3a is the same as that of the first embodiment.

Figure 7A:
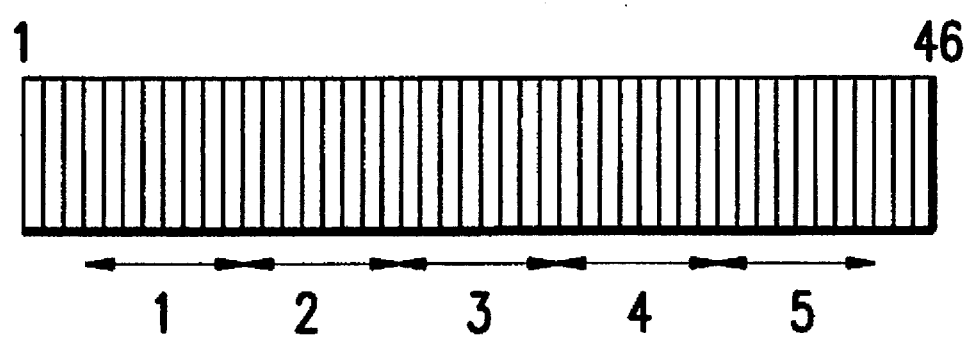
FIGS. 7(a)–7(c) are schematic diagrams illustrating the calculation ranges of the second embodiment.
Figure 7B:
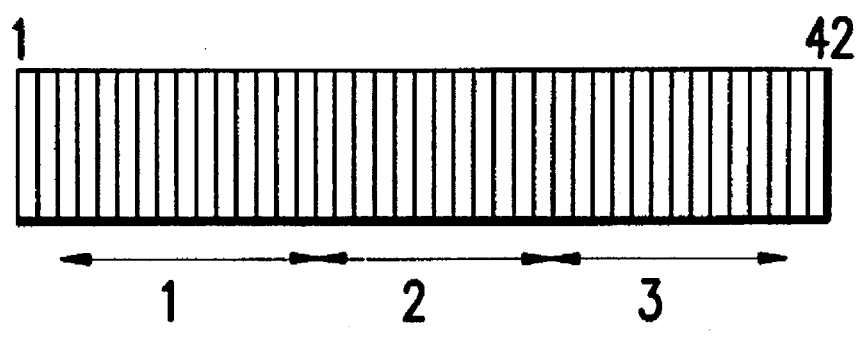
Figure 7C:
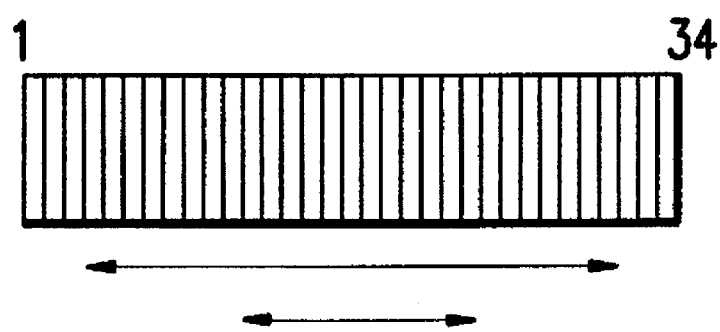

The contents of the calculation range setting circuit 3b differ from that of the first embodiment. FIGS. 7(a)–(c) show the calculation ranges set for s=2, s=4, and s=8, respectively. The solid line illustrates a wide mode, and the dashed line illustrates a spot mode. In the wide mode, when s=2, virtually the entire area is divided into 5 blocks. In this case, focus detection calculations are executed for each block, and the value that indicates the nearest distance, for example, is selected from among the maximum of 5 defocus amounts obtained. Similarly, when s=4 in the wide mode, the area is divided into 3 blocks. When s=8 in the wide mode, since, as described above, a wide calculation range is desirable, block division is not carried out, and virtually the entire area is taken as a single calculation area. When s=2, the calculation range of the spot mode is k=17 and r=30; when s=4, k=16 and r=27. When s=8, in spot mode 1, spot mode 3, and wide mode 1 (described hereafter), the calculation range is the same as that of the wide mode shown by the solid line in FIG. 7(c), and k=4 and r=31.

The focus detection frame that is displayed on the finder screen of the camera in the spot mode is taken as the area that corresponds to the calculation range for the above-mentioned spot mode in which s=2, and will be referred to hereafter simply as the spot area. In spot mode 2 (described hereafter), when the contrast determining circuit 4 determines that there is a strong contrast outside the spot area, the range shown by the dotted line in FIG. 7(c) is used, for which k=13 and r=22.

The threshold values E1 and G1 in Formula 6, which are set by the threshold value setting circuit 3c, differ according to the filter process and are taken as E1=Ea and G1=Ga when s=2, E1=Eb and G1=Gb when s=4, and E1=Ec and G1=Gc when s=8. These threshold values have the same relationship as described by Formula 9. In the third spot mode, when the contrast determining circuit 4 determines that there is a strong contrast outside the spot area, the threshold value for s=8 is taken to be a value that is more restrictive than the above-mentioned Ec.

The maximum shift number lmax in Formula 1, which is set by the maximum shift number setting circuit 3d, differs according to the filter process. lmax=la when s=2, lmax=lb when s=4, and lmax=lc when s=8. These values have the same relationship as described by Formula 10. In the spot modes 2 and 3 when the contrast determining circuit 4 determines that there is a strong contrast outside the spot area, the maximum shift number for s=8 is taken to be a value that is smaller than the above-mentioned lc.

The focus detection calculating circuit 3e carries out focus detection calculations according to Formulas 1–6 using the filter processing data Fa[i] and Fb[i] and calculates the focus adjustment condition of the photo lens 100, i.e., the defocus amount. In the wide mode, where s=2 or s=4, focus detection calculations are carried out for each block. The contrast determining circuit 4 calculates the contrast in each region to the left and right of the spot area of at least one of the filter processing data Fa[i] and Fb[i] that is obtained through the filter processing using s=2. The PP value is also calculated. The contrast determining circuit 4 then determines whether there is a strong contrast outside the spot area, based on the determined contrast and PP value. The calculation range in the spot mode for s=2 is from 17 to 30, and since the calculation range is the same as that on the first embodiment, the calculations and determinations are carried out through the same formulas as on the first embodiment.

The operation of the second embodiment will be described using FIGS. 8–12.

Figure 8:
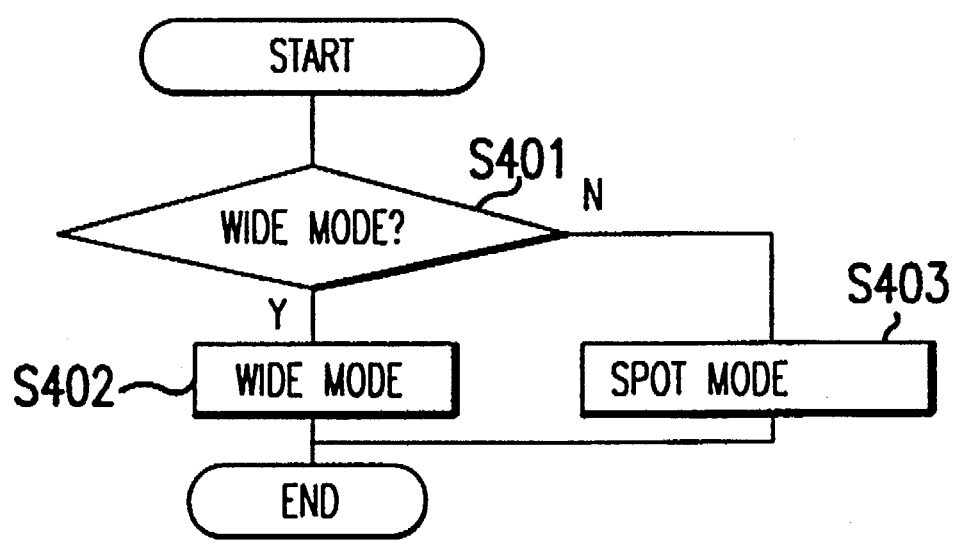
FIG. 8 is a flow chart of the entire operation of the second embodiment.

FIG. 8 is a flow chart that shows the entire operation of the second embodiment. In step S401, it is determined whether the wide mode is selected through the mode setting circuit 5. If the wide mode is selected, the program proceeds to step S402 and executes the wide mode. If the wide mode is not selected, the program proceeds to step S403 and executes the spot mode.

Figure 9:
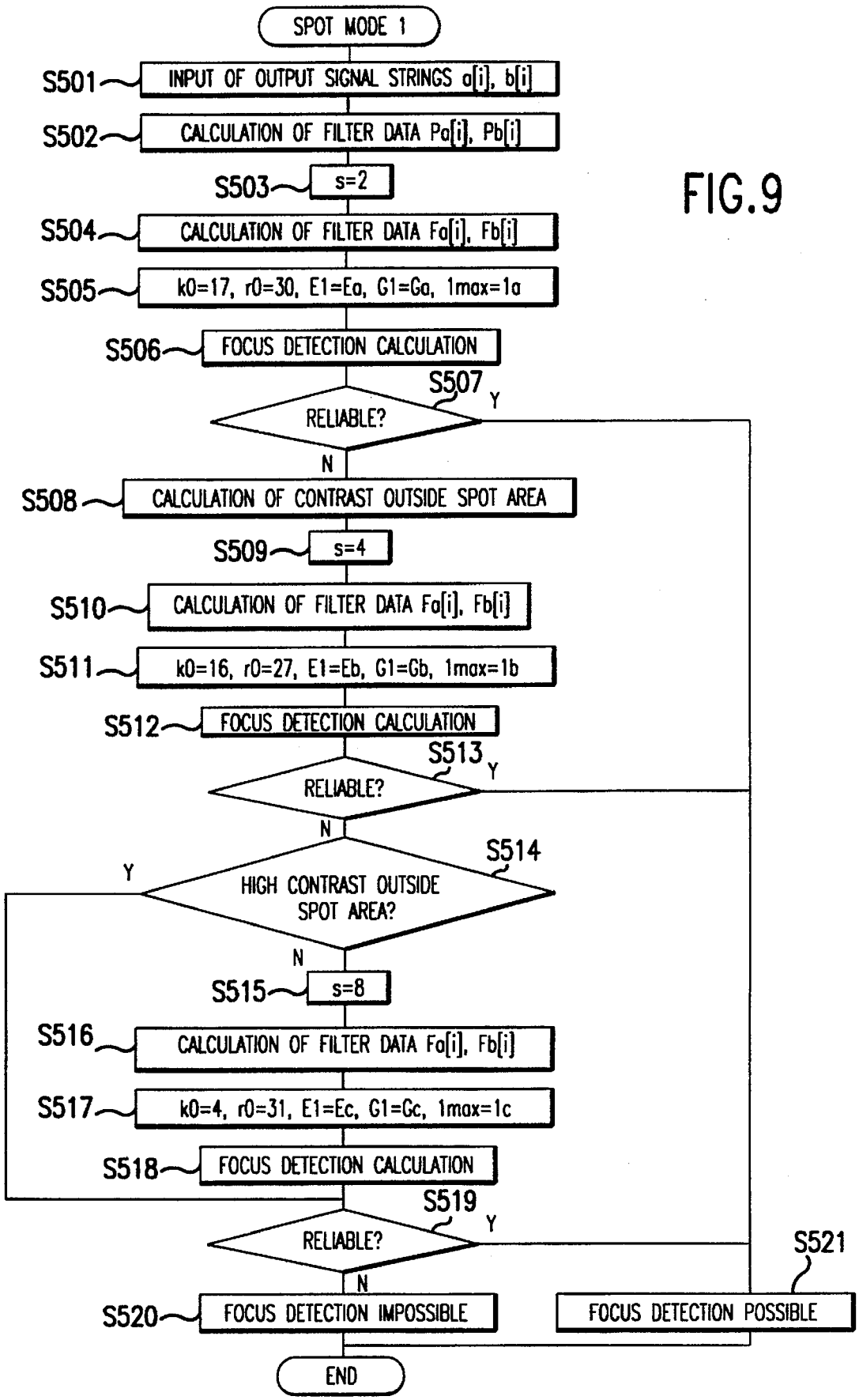
FIG. 9 is a flow chart of the operation of the first spot mode of the second embodiment.

FIG. 9 is a flow chart that shows the first operation of the spot mode in step S403 of FIG. 8. In this first operation, when it is determined through the contrast determining circuit 4 that there is a strong contrast outside the spot area, a focus detection calculation based on filter processing data for which low frequency components are extracted with s=8 is prevented.

In step S501, output signal strings a[i] and b[i] are input from the image sensor 2. The program then proceeds to step S502 and calculates filter processing data Pa[i] and Pb[i] through Formula 7. In step S503, the value of s in Formula 8 is set to 2, and in step S504, filter processing data Fa[i] and Fb[i] are calculated by executing the filter calculation according to Formula 8. In step S505, the following values are set: initial value k0=17, final value r0=30, threshold value E1=Ea, threshold value G1=Ga, and the maximum shift number lmax=la. In step S506, the focus detection calculations of Formulas 1–6 are executed using the calculation range, threshold values, and maximum shift number set in the preceding step.

In step S507, it is determined whether a reliable defocus amount is obtained. If a reliable defocus amount is obtained, the program advances to step S521, focus detection is determined to be possible, and the operation ends. Conversely, if a reliable defocus amount is not obtained, the program proceeds to step S508, calculates the contrast outside the spot area and the PP value through Formulas 11 and 12, respectively, and determines through Formula 13 whether a strong contrast exists outside the spot area. In step S509, the s value in Formula 8 is set to 4. The program proceeds to step S510 and calculates filter processing data Fa[i] and Fb[i] according to Formula 8. In step S511, the following values are set: initial value k0=16, final value r0=27, threshold value E1=Eb, threshold value G1=Gb, and the maximum shift number lmax=lb. In the following step S512, the focus detection calculations of Formulas 1–6 are executed using the calculation range, threshold values, and maximum shift number set in the preceding step.

In step S513, it is determined whether a reliable defocus amount is obtained. If a reliable defocus amount is obtained, the program advances to step S521, focus detection is determined to be possible, and the operation ends. If a reliable defocus amount is not obtained, the program proceeds to step S514, and if it has been determined in step S508 that a strong contrast does not exist outside the spot area, the program proceeds to step S515. In step S515, the s value in Formula 8 is set to 8. The program proceeds to step S516 and calculates filter data Fa[i] and Fb[i] according to Formula 8. In step S517, the following values are set: initial value k0=4, final value r0=31, threshold value E1=Ec, threshold value G1=Gc, and the maximum shift number lmax=lc. In step S518, the focus detection calculations of Formulas 1–6 are executed using the calculation range, threshold values, and maximum shift number set in the preceding step.

In step S519, it is determined whether a reliable defocus amount is obtained. If a reliable defocus amount is obtained, the program proceeds to step S521, focus detection is possible, and the operation ends. Conversely, if a reliable defocus amount is not obtained, the program proceeds to step S520, focus detection is determined to be impossible, and the operation ends.

If it has been determined in step S514 that a strong contrast does exist outside the spot area, a focus detection calculation based on filter processing data for which even lower frequency components as extracted is prevented, the program advances to step S520, focus detection is determined to be impossible, and the operation ends. According to the first operation of the second embodiment, in the case of the subject patterns shown in FIG. 22 and FIG. 23, since a focus detection calculation based on filter processing data having low frequency components extracted is not carried out because strong contrast exists outside the spot area, focus detection becomes impossible. In the case of the subject patterns shown in FIG. 21 and FIG. 18, since a focus detection calculation is executed based on filter processing data having low frequency components extracted because strong contrast does not exist outside the spot area, focus detection becomes possible and a defocus amount can be determined.

Steps S501–S504, S509, S510, S515, and S516 are operations of the filter processing circuit 3a; steps S505, S511, and S517 are operations of the calculation range setting circuit 3b, the threshold value setting circuit 3c, and the maximum shift number setting circuit 3d. Steps S508 and S514 are operations of the contrast determining circuit 4, and all other steps are operations of the focus detection calculating circuit 3e.

Figure 10:
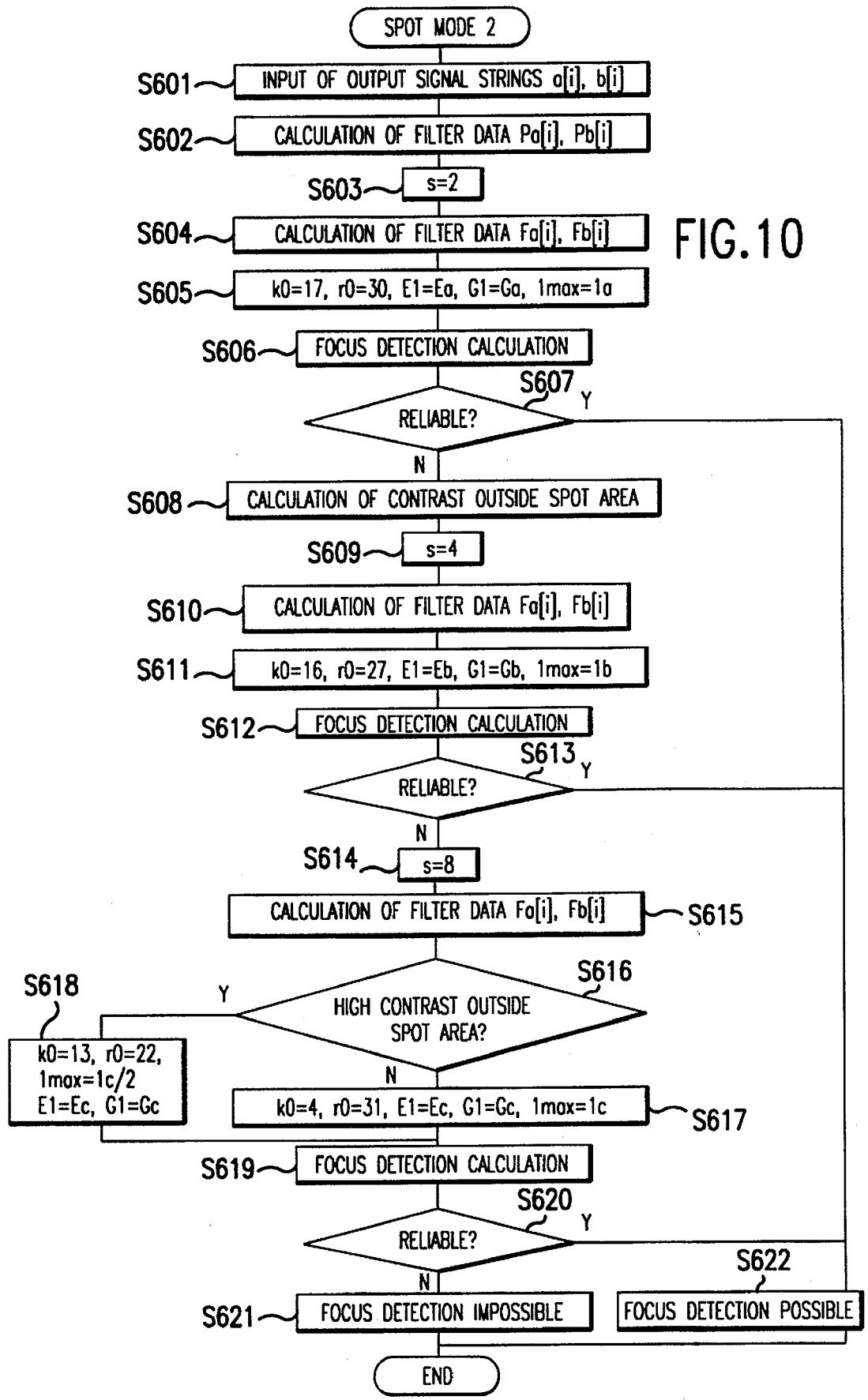
FIG. 10 is a flow chart of the operation of the second spot mode of the second embodiment.

FIG. 10 is a flow chart that shows a variation of the first operation of the spot mode (hereafter called the second operation of the spot mode) in step S403 of FIG. 8. In this second operation, when it is determined through the contrast determining circuit 4 that there is a strong contrast outside the spot area, the calculation range is narrowed in the focus detection calculation based on filter processing data having low frequency components extracted with s=8, the maximum shift number is decreased, and the shift range is narrowed.

In step S601, output signal strings a[i] and b[i] are input from the image sensor 2. The program then proceeds to step S602 and calculates filter processing data Pa[i] and Pb[i] through Formula 7. In step S603, the value of s in Formula 8 is set to 2, and in step S604, filter processing data Fa[i] and Fb[i] are calculated according to Formula 8. In step S605, the following values are set: initial value k0=17, final value r0=30, threshold value E1=Ea, threshold value G1=Ga, and the maximum shift number lmax=la. In step S606, the focus detection calculations of Formulas 1–6 are executed using the calculation range, threshold values, and maximum shift number set in the preceding step.

In step S607, it is determined whether a reliable defocus amount is obtained. If a reliable defocus amount is obtained, the program advances to step S622, focus detection is determined to be possible, and the operation ends. Conversely, if a reliable defocus amount is not obtained, the program proceeds to step S608, calculates the contrast outside the spot area and the PP value through Formulas 11 and 12, respectively, and determines through Formula 13 whether a strong contrast exists outside the spot area. In step S609, the s value in Formula 8 is set to 4, and in step S610, filter processing data Fa[i] and Fb[i] are calculated according to Formula 8. In step S611, the following values are set: initial value k0=16, final value r0=27, threshold value E1=Eb, threshold value G1=Gb, and the maximum shift number lmax=lb. In step S612, the focus detection calculations of Formulas 1–6 are executed using the calculation range, threshold values, and maximum shift number set in the preceding step.

In step S613, it is determined whether a reliable defocus amount is obtained. If a reliable defocus amount is obtained, the program advances to step S622, focus detection is determined to be possible, and the operation ends. Conversely, if a reliable defocus amount is not obtained, the program proceeds to step S614 and sets the s value to 8. Next, in step S615, filter processing data Fa[i] and Fb[i] are calculated according to Formula 8. In step S616, if it is determined in step S608 that strong contrast does not exist outside the spot area, the program proceeds to step S617, in which a wide calculation range and a large maximum shift number are set; if it is determined that strong contrast does exist outside the spot area, the program proceeds to step S618, in which a narrow calculation range and a small maximum shift number are set. In step S617, the following values are set: initial value k0=4, final value r0=31, threshold value E1=Ec, threshold value G1=Gc, and the maximum shift number lmax=lc. In step S618, the following values are set: initial value k0=13, final value r0=22, threshold value E1=Ec, threshold value G1=Gc, and the maximum shift number lmax=lc/2. In step S619, the focus detection calculations of Formulas 1–6 are executed using the calculation range, threshold values, and maximum shift number set in step S617 or step S618.

In step S620, it is determined whether a reliable defocus amount is obtained. If a reliable defocus amount is obtained, the program proceeds to step S622, focus detection is possible, and the operation ends. If a reliable defocus amount is not obtained, the program proceeds to step S621, focus detection is determined to be impossible, and the operation ends.

According to this second operation, in the case of the subject patterns shown in FIG. 22(a) and FIG. 23 where strong contrast exists outside the spot area, a focus detection calculation based on filter processing data having low frequency components extracted is carried out with a narrow calculation range and a small maximum shift number. Specifically, with respect to the subject pattern shown in FIG. 22(a), focus detection is carried out for an area with no contrast since the calculation range is narrow. Therefore, focus detection becomes impossible. With regard to the subject pattern shown in FIG. 23, since a correlation amount is not calculated for a shift amount that will result in false focus, focus detection becomes impossible through the setting of a small maximum shift number. With respect to the subject patterns shown in FIG. 21(a) and FIG. 18(a), since strong contrast does not exist outside the spot area, a focus detection calculation based on filter processing data having low frequency components extracted is carried out with a wide calculation range and a large maximum shift number. Consequently, focus detection becomes possible and a defocus amount can be detected.

In step S618, the maximum shift number was decreased to ½ of the normal value. However, the decrease in the maximum shift number is not limited to this value.

Steps S601–S604, S609, S610, S614, and S615 are operations of the filter processing circuit 3a; steps S605, S611, S617, and S618 are operations of the calculation range setting circuit 3b, the threshold value setting circuit 3c, and the maximum shift number setting circuit 3d. Steps S608 and S616 are operations of the contrast determining circuit 4, and all other steps are operations of the focus detection calculating circuit 3e.

Figure 11:
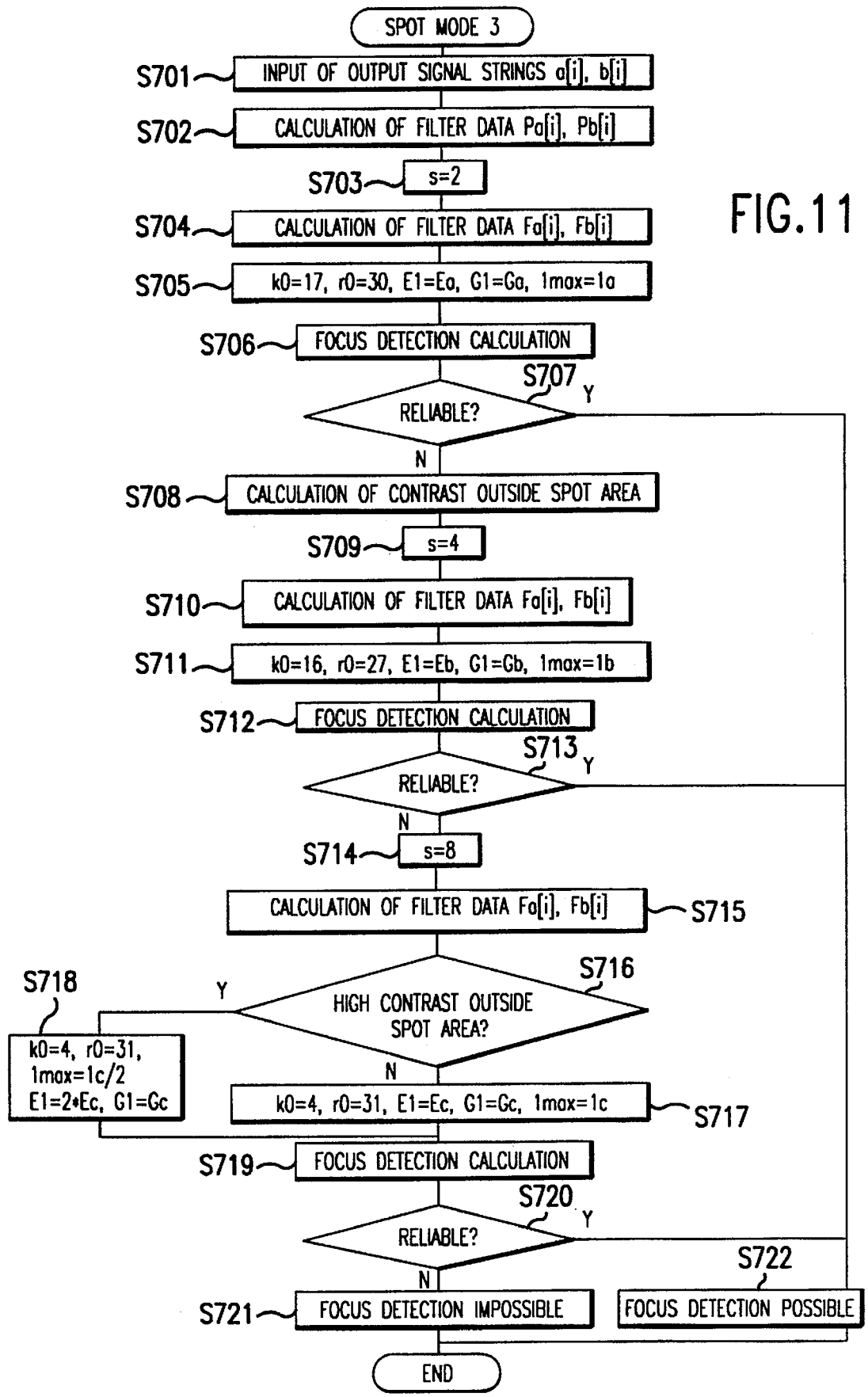
FIG. 11 is a flow chart of the operation of the third spot mode of the second embodiment.

FIG. 11 is a flow chart that shows another variation of the first operation of the spot mode (hereafter called the third operation of the spot mode) in step S403 of FIG. 8. In this third operation, when it is determined through the contrast determining circuit 4 that there is a strong contrast outside the spot area, the threshold values are made more restrictive for the focus detection calculation based on filter processing data having low frequency components extracted, the maximum shift number is decreased, and the shift range is narrowed.

In step S701, output signal strings a[i] and b[i] are input from the image sensor 2. The program then proceeds to step S702 and calculates filter processing data Pa[i] and Pb[i] through Formula 7. In step S703, the value of s in Formula 8 is set to 2, and in step S704, filter processing data Fa[i] and Fb[i] are calculated according to Formula 8. In step S705, the following values are set: initial value k0=17, final value r0=30, threshold value E1=Ea, threshold value G1=Ga, and the maximum shift number lmax=la. In step S706, the focus detection calculations of Formulas 1–6 are executed using the calculation range, threshold values, and maximum shift number set in the preceding step.

In step S707, it is determined whether a reliable defocus amount is obtained. If a reliable defocus amount is obtained, the program advances to step S722, focus detection is determined to be possible, and the operation ends. Conversely, if a reliable defocus amount is not obtained, the program proceeds to step S708, calculates the contrast outside the spot area and the PP value through Formula 11 and Formula 12, respectively, and determines through Formula 13 whether a strong contrast exists outside the spot area. In step S709, the s value in Formula 8 is set to 4, and in the following step S710, filter processing data Fa[i] and Fb[i] are calculated by executing the filter calculation according to Formula 8. In step S711, the following values are set: initial value k0=16, final value r0=27, threshold value E1=Eb, threshold value G1=Gb, and the maximum shift number lmax=lb. In step S712, the focus detection calculations of Formulas 1–6 are executed using the calculation range, threshold values, and maximum shift number set in the preceding step.

In step S713, it is determined whether a reliable defocus amount is obtained. If a reliable defocus amount is obtained, the program advances to step S722, focus detection is determined to be possible, and the operation ends. Conversely, if a reliable defocus amount is not obtained, the program proceeds to step S714 and sets the s value to 8. In step S715, filter processing data Fa[i] and Fb[i] are calculated according to Formula 8. In step S716, if it is determined in step S708 that strong contrast does not exist outside the spot area, the program proceeds to step S717, in which a normal threshold value and a large maximum shift number are set; if it is determined that strong contrast does exist outside the spot area, the program proceeds to step S718, in which a restrictive threshold value and a small maximum shift number are set. In step S717, the following values are set: initial value k0=4, final value r0=31, threshold value E1=Ec, threshold value G1=Gc, and the maximum shift number lmax=lc. In step S718 the following values are set: initial value k0=4, final value r0=31, threshold value E1=2xEc, threshold value G1=Gc, and the maximum shift number lmax=lc/2. In step S719, the focus detection calculations of Formulas 1–6 are executed using the calculation range, threshold values, and maximum shift number set in step S717 or step S718.

In step S720, it is determined whether a reliable defocus amount is obtained. If a reliable defocus amount is obtained, the program proceeds to step S722, focus detection is possible, and the operation ends. Conversely, if a reliable defocus amount is not obtained, the program proceeds to step S721, focus detection is determined to be impossible, and the operation ends.

According to this third operation, in the case of the subject patterns shown in FIG. 22(a) and FIG. 23, a focus detection calculation based on filter processing data having low frequency components extracted is carried out with a restrictive threshold value and a small maximum shift number. With respect to FIG. 22(a), since the threshold value becomes restrictive, there is no reliability even though contrast exists in the calculation range, and focus detection becomes impossible. With respect to FIG. 23, since a correlation amount is not calculated for a shift amount that will result in false focus, focus detection becomes impossible through the setting of a small maximum shift number. In the case of the subject patterns shown in FIG. 21(a) and FIG. 18(a), since strong contrast does not exist outside the spot area, a focus detection calculation based on filter processing data having low frequency components extracted is carried out with a restrictive threshold value and a large maximum shift number, focus detection becomes possible, and a defocus amount can be detected.

In step S718, only the threshold value E1 was set so as to be restrictive. However, the threshold value G1 may also be set so as to be restrictive. In addition, the threshold value was set to be twice the normal threshold value. However, the threshold value is not limited to this value.

Furthermore, instead of using the numerical value E, the contrast for one of a pair of data may be calculated, and the evaluation may be carried out using this value.

In addition, in the third operation, a focus detection calculation based on filter processing data for which low frequency components have been extracted with s=8 is carried out with a wide calculation range even if strong contrast exists outside the spot area. However, it is also acceptable to set a narrow calculation range, as in the second operation.

Steps S701–S704, S709, S710, S714, and S715, are operations of the filter processing circuit 3a; steps S705, S711, S717, and S718 are operations of the calculation range setting circuit 3b, the threshold value setting circuit 3c, and the maximum shift number setting circuit 3d. Steps S708 and S716 are operations of the contrast determining circuit 4, and all other steps are operations of the focus detection calculating circuit 3e.

It is obvious that while the first through third operations are disclosed as provided separately in a single camera, any two or all three operations may be combined in a single camera.

Figure 12:
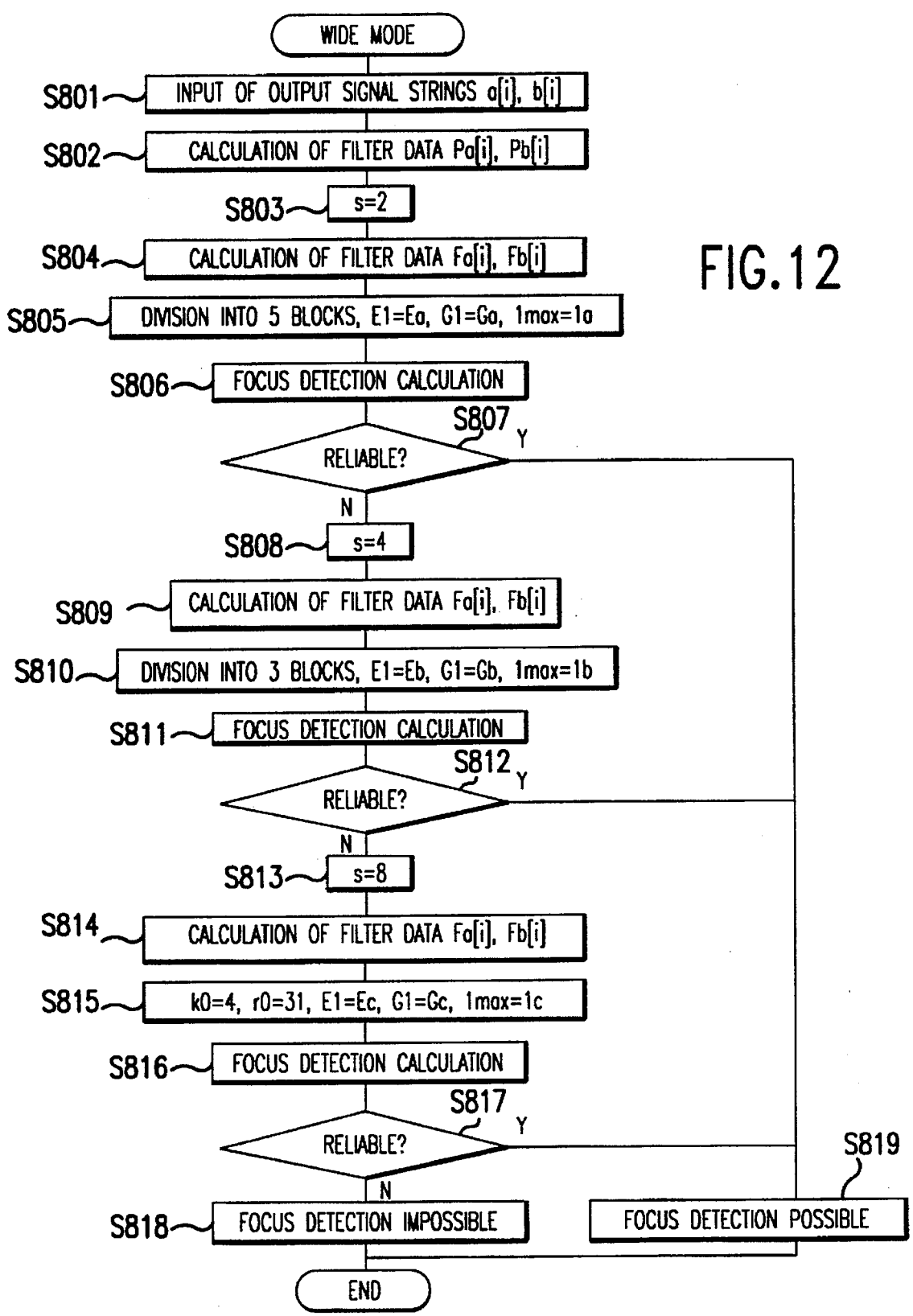
FIG. 12 is a flow chart of the operation of the wide mode of the second embodiment.
Figure 13:
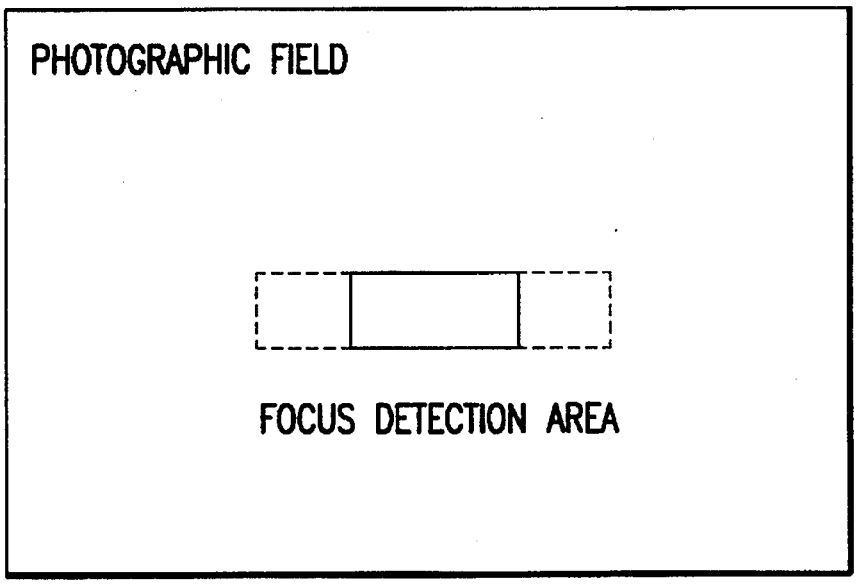
FIG. 13 is a schematic diagram illustrating the relationship of the positions of a conventional photographic field and focus detection region.

FIG. 12 is a flow chart that shows the operation of the wide mode in step S402 of FIG. 8. In this wide mode operation, a determination is not executed by the contrast determining circuit 4, and the filter processing is switched until a reliable defocus amount is obtained.

In step S801, output signal strings a[i] and b[i] are input from the image sensor 2. The program then proceeds to step S802 and calculates filter processing data Pa[i] and Pb[i] through Formula 7. In step S803, the value of s in Formula 8 is set to 2, and in step S804, filter processing data Fa[i] and Fb[i] are calculated according to Formula 8. In step S805, the area is divided into 5 blocks as shown in FIG. 7 (a), and the following values are set: threshold value E1=Ea, threshold value G1=Ga, and the maximum shift number lmax=la. In step S806, the focus detection calculations of Formulas 1–6 are executed using the 5 blocks, threshold values, and maximum shift number set in the preceding step.

In step S807, it is determined whether there is a block for which a reliable defocus amount is obtained. If a block with a reliable defocus amount is obtained, the program advances to step S819, focus detection is determined to be possible, and the operation ends. If it is determined that there is no reliability in any of the blocks, the program proceeds to step S808 and sets the s value in Formula 8 to 4. In the following step S809, the filter processing data Fa[i] and Fb[i] are obtained according to Formula 8. In step S810, the area is divided into 3 blocks as shown in FIG. 7 (b), and the following values are set: threshold value E1=Eb, threshold value G1=Gb, and the maximum shift number lmax=lb. In step S811, the focus detection calculations of Formulas 1–6 are executed using the three blocks, threshold values, and maximum shift number set in the preceding step.

In step S812, it is determined whether there is a block for which a reliable defocus amount is obtained. If a block with a reliable defocus amount is obtained, the program advances to step S819, focus detection is determined to be possible, and the operation ends. If it is determined that there is no reliability in any of the blocks, the program proceeds to step S813 and sets the s value in Formula 8 to be 8. In step S814, the filter data Fa[i] and Fb[i] are obtained by executing the filter calculation according to Formula 8. In step S815, the following values are set: initial value k0=4, final value r0=31, threshold value E1=Ec, threshold value G1=Gc, and the maximum shift number lmax=lc. In step S816, the focus detection calculations of Formulas 1–6 are executed using the calculation range, threshold values, and maximum shift number set in the preceding step.

In step S817, it is determined whether a reliable defocus amount is obtained. If a reliable defocus amount is obtained, the program proceeds to step S819, focus detection is possible, and the operation ends. Conversely, if a reliable defocus amount is not obtained, the program proceeds to step S818, focus detection is determined to be impossible, and the operation ends.

Steps S801–S804, S808, S809, S813, and S814 are operations of the filter processing circuit 3a; steps S805, S810, and S815 are operations of the calculation range setting circuit 3b, the threshold value setting circuit 3c, and the maximum shift number setting circuit 3d. All other steps are operations of the focus detection calculating circuit 3e.

In the above-mentioned wide mode, no determinations are made through the contrast determining circuit 4. However, the contrast determining circuit 4 may be used to determine the contrast outside the spot area, in the same manner as the spot mode, and to prevent focus detection calculations that are based on filter processing data with s=8 when a strong contrast exists, or else to carry out the focus detection calculations with decreased maximum shift numbers and restrictive threshold values. By taking these measures, the possibility of false focus will be reduced.

In the illustrated embodiments, the focus detection controller 3 is implemented as a single special purpose integrated circuit (e.g., ASIC) having a main or central processor section for overall, system-level control, and separate sections dedicated to performing various different specific computations, functions and other processes under control of the central processor section. It will be appreciated by those skilled in the art that the controller can also be implemented using a plurality of separate dedicated or programmable integrated or other electronic circuits or devices (e.g., hardwired electronic or logic circuits such as discrete element circuits, or programmable logic devices such as PLDs, PLAs, PALs or the like). The controller can also be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the flowcharts shown in FIGS. 3–5 and 8–12 can be used as the controller.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the scope of the invention as defined in the following claims.

What is claimed is:

1. A focus detection device, comprising:
   an output device that outputs a pair of signal strings, said output device including at least a pair of photoelectric converting element arrays;
   a focus detection optical system that conducts a pair of light rays from a subject to the pair of photoelectric converting element arrays;
   a calculation setting device that sets a range of signals within the pair of signal strings for use in a focus adjustment condition calculation;
   a focus detection calculating device that calculates a focus adjustment condition for a photo lens based on the signal range set by the calculation range setting device; and
   a contrast calculation device that calculates a contrast based on signals of at least one of the signal strings that are excluded from signals corresponding with a preselected focus detection area, wherein the operation of the focus detection calculating device is dependent upon the calculated contrast.

2. The device according to claim 1, wherein said output device includes a filter that extracts a pair of signal strings having a predetermined frequency component from a pair of signal strings outputted by the photoelectric converting element arrays, wherein the extracted pair of signal strings are the signal strings outputted by the output device.

3. The device according to claim 2, wherein if a calculated contrast exceeds a specified value, the focus detection calculating device will not carry out a focus detection calculation based on a pair of signal strings output by the output device having components lower than a predetermined frequency.

4. The device according to claim 2, wherein said focus detection calculating device includes a relative amount calculation device which calculates a relative shift amount of a pair of the signals in a shift range, further wherein if a calculated contrast exceeds a specified value, the focus detection calculating device narrows the shift range for a focus detection calculation based on a pair of signal strings output by the output device having components lower than a predetermined frequency.

5. The device according to claim 2, further comprising:
   a reliability evaluating device that compares a value calculated by the focus detection calculating device with a pre-set threshold value to determine reliability of a calculated defocus amount, wherein if a calculated contrast exceeds a specified value, the reliability evaluating device changes the threshold value for a focus detection calculation based on a pair of signal strings output by the output device having components lower than a predetermined frequency.

6. The device according to claim 2, wherein if a calculated contrast exceeds a specified value, the calculation range setting device narrows the range for a focus detection calculation based on a pair of signal strings output by the output device having components lower than a predetermined frequency.

7. The device according to claim 1, wherein the focus detection device can switch between a wide mode and a spot mode.

8. The device according to claim 1, wherein the focus detection system includes the photo lens for which the focus detection calculating device calculates a focus adjustment condition.

9. A focus detection device, comprising:
   output means for outputting a pair of signal strings, said output means including at least a pair of photoelectric converting element arrays;
   focus detection optical means for conducting a pair of light rays from a subject to the pair of photoelectric converting element arrays;
   calculation range setting means for setting a range of signals within the pair of signal strings for use in a focus adjustment condition calculation;
   focus detection calculating means for calculating a focus adjustment condition for a photo lens based on the signal range set by the calculation range setting means; and
   contrast calculation means for calculating a contrast based on signals of at least one of the signal strings that are excluded from the signals corresonding with a preselected focus detection area, wherein the operation of the focus detection calculation means is dependent upon the calculated contrast.

10. The device according to claim 9, wherein said output means includes a filter that extracts a pair of signal strings having a predetermined frequency component from a pair of signal strings output by the photoelectric converting element arrays, wherein the extracted pair of signal strings are the signal strings output by the output means.

11. The device according to claim 10, wherein if a calculated contrast exceeds a specified value, the focus detection calculating means will not carry out a focus detection calculation based on signal strings output by the output means having components lower than a predetermined frequency.

12. The device according to claim 10, wherein said focus detection calculating means includes a relative amount calculation means for calculating a relative shift amount of a pair of signals in a shift range, further wherein if a calculated contrast exceeds a specified value, the focus detection calculating means will narrow the shift range for a focus detection calculation based on signal strings output by the output means having components lower than a predetermined frequency.

13. The device according to claim 10, further comprising:
   a reliability evaluating means for comparing a value calculated by the focus detection calculating means with a pre-set threshold value and for evaluating the reliability of a calculated defocus amount, wherein if a calculated contrast exceeds a specified value, the reliability evaluating means changes the threshold value for a focus detection calculation based on a pair of signal strings having components lower than a predetermined frequency.

14. The device according to claim 10, wherein if a calculated contrast exceeds a specified value, the calculation range setting means narrows the range for a focus detection calculation based on a pair of signal strings having components lower than a predetermined frequency.

15. The device according to claim 9, wherein the focus detection device can switch between a wide mode and a spot mode.

16. The device according to claim 9, wherein the focus detection means includes the photo lens for which the focus detection calculating means calculates a focus adjustment condition.

17. A focus detection method, comprising:

outputting a pair of signal strings from an output device;

conducting a pair of light rays from a subject to a pair of photoelectric converting element arrays;

setting a range of signals within the pair of signal strings for use in a focus adjustment calculation;

calculating a focus adjustment based on the set range of signals;

calculating a contrast based on signals of at least one of the signal strings that are excluded from signals corresponding with a preselected focus detection area; and controlling focus adjustment based upon the calculated contrast.

18. The method of claim 17, further comprising the step of extracting a pair of signal strings having a predetermined frequency component from the pair of signal strings output from the output device.

19. The method of claim 18, further comprising the step of preventing the execution of subsequent focus detection calculation based on signal strings having components lower than a predetermined frequency if a calculated contrast exceeds a specified value.

20. The method of claim 18, further comprising the step of calculating a relative shift amount of a pair of signals in a shift range and narrowing the shift range for a subsequent focus detection calculation based on signal strings having components lower than a predetermined frequency if a calculated contrast exceeds a specified value.

21. The method of claim 18, further comprising the step of evaluating the reliability of a calculated defocus amount by comparing a calculated value with a pre-set threshold value, wherein if a calculated contrast exceeds a specified value, further performing the step of changing the threshold value.

22. The method of claim 18, further comprising the step of narrowing the calculation range for a focus detection calculation based on a pair of signal strings having components lower than a predetermined frequency if a calculated contrast exceeds a specified value.

23. The method of claim 18, further comprising the step of changing between a wide mode and a spot mode.

24. The method of claim 17, further comprising the step of conducting the pair of light rays through a photo lens, wherein said step of calculating a focus adjustment includes calculating a focus adjustment for the photo lens.

* * * * *